(12) United States Patent
Nitta

(10) Patent No.: US 8,249,202 B2
(45) Date of Patent: Aug. 21, 2012

(54) COMMUNICATION SYSTEM, SIGNAL PROCESSING METHOD, SIGNAL PROCESSING DEVICE, AND MOVABLE BODY

(75) Inventor: Manabu Nitta, Tokyo (JP)

(73) Assignee: Sony Corporation, Tokyo (JP)

( * ) Notice: Subject to any disclaimer, the term of this patent is extended or adjusted under 35 U.S.C. 154(b) by 250 days.

(21) Appl. No.: 12/710,624

(22) Filed: Feb. 23, 2010

(65) Prior Publication Data

US 2010/0260239 A1 Oct. 14, 2010

(30) Foreign Application Priority Data

Apr. 10, 2009 (JP) ................................. 2009-096195

(51) Int. Cl.
*H03D 1/00* (2006.01)
*G06F 15/00* (2006.01)
(52) U.S. Cl. .................... 375/343; 708/404; 708/409
(58) Field of Classification Search .................. 375/316, 375/340, 343, 326; 708/100, 200, 400, 402, 708/403, 404, 405, 408, 409, 800, 801, 820, 708/821; 370/203, 210
See application file for complete search history.

(56) References Cited

U.S. PATENT DOCUMENTS 7,639,181 B2 * 12/2009 Wang et al. .............. 342/357.59
2003/0187576 A1 10/2003 Sanmiya et al.
2009/0013021 A1 1/2009 Jhang et al.

FOREIGN PATENT DOCUMENTS

JP 3906913 1/2007

* cited by examiner

*Primary Examiner* — David C. Payne
*Assistant Examiner* — Vineeta Panwalkar
(74) *Attorney, Agent, or Firm* — Oblon, Spivak, McClelland, Maier & Neustadt, L.L.P.

(57) ABSTRACT

A communication system includes: a sampling section that samples a reception signal; a preprocessing execution section that acquires a sampling value, which is obtained by the sampling section, while executing preprocessing for performing a Fast Fourier Transform in a divided manner; and a Fast Fourier Transform section that performs the Fast Fourier Transform in the divided manner on the basis of an output acquired from the processing execution section.

6 Claims, 21 Drawing Sheets

COMMUNICATION SYSTEM, SIGNAL PROCESSING METHOD, SIGNAL PROCESSING DEVICE, AND MOVABLE BODY

BACKGROUND OF THE INVENTION

1. Field of the Invention

The present invention relates to a communication system, a signal processing method, a signal processing device, and a movable body.

2. Description of the Related Art

In recent years, a GPS (Global Positioning System) receiver receiving a navigation message transmitted from an artificial satellite and calculating the current position thereof is being widely used by being applied to mobile telephones, car navigation systems, and the like.

Specifically, the navigation message transmitted from the artificial satellite contains orbit information indicating the orbit of the artificial satellite, and information such as transmission time of a signal. The GPS receiver receives the navigation messages from four or more artificial satellites, and calculates the position of each artificial satellite from the orbit information contained in the navigation message. The GPS receiver then calculates the current three-dimensional position through a simultaneous equation on the basis of the position of each artificial satellite and the difference in the transmission time and the reception time of the navigation message. In addition, the navigation messages transmitted from the four or more artificial satellites are desired when calculating the three-dimensional position. The reason is that an error exists between the clock incorporated in the GPS receiver and an atomic clock provided in the artificial satellite.

Further, each artificial satellite spreads the spectrum of data of 50 bps by using a signal termed an L1-band C/A code, that is, a pseudo-random (PRN: Pseudo-Random Noise) code, of which the code length is 1,023 and the chip rate is 1.023 MHz, and transmits the navigation message on the basis of a signal in which a carrier of 1,575.42 MHz is BPSK (Binary Phase Shift Keying) modulated by using the spread spectrum signal.

Accordingly, when the GPS receiver is intended to receive the signal transmitted from the artificial satellite, it is necessary to synchronize the PRN code, the carrier, and the data. The synchronization between the reception signal and the PRN code is achieved in a way that correlation between the PRN code of the reception signal and the PRN code which is generated in the apparatus itself is calculated, for example, by using the Fast Fourier Transform.

Japanese Patent No. 3906913 discloses a receiver capable of obtaining the entire frequency components by performing L (L is an integer) times the Fast Fourier Transform for obtaining a 1/L frequency component of the entire frequency. By using the receiver, it is possible to reduce the usage of the memory holding the result of the Fast Fourier Transform.

SUMMARY OF THE INVENTION

However, in the Fast Fourier Transform performed L times by the receivers used in the past, a lot of repeated calculations are contained. Accordingly, in the receivers used in the past, there is a problem in that the number of calculations and the calculation time increase.

The invention has been made in view of the above-mentioned problem, and it is desirable to provide a new and improved communication system capable of shortening the time of calculation for the Fast Fourier Transform, a signal processing method, a signal processing device, and a movable body.

In order to solve the above-mentioned problem, according to an embodiment of the invention, there is provided a communication system including: a sampling section that samples a reception signal; a preprocessing execution section that acquires a sampling value, which is obtained by the sampling section, while executing preprocessing for performing a Fast Fourier Transform in a divided manner; and a Fast Fourier Transform section that performs the Fast Fourier Transform in the divided manner on the basis of an output acquired from the processing execution section.

In this case, it is preferable that the preprocessing execution section should include a signal generation section that generates a periodic signal, a multiplier section that multiplies the sampling value, which is obtained by the sampling section, and a value of the periodic signal which is generated by the signal generation section, and an accumulator section that accumulates the respective multiplied values, which are obtained by the multiplier section, at a predetermined interval in an order, which is obtained by the multiplier section, so as to obtain a plurality of accumulated values. It is also preferable that the Fast Fourier Transform section should perform the Fast Fourier Transform on the plurality of accumulated values which is obtained by the accumulator section.

In this case, it is preferable that the communication system should include plurality of the preprocessing execution sections. It is also preferable that the signal generation sections, each of which is included in each of the preprocessing execution sections, should generate periodic signals having different periods.

In this case, it is preferable that the accumulator sections corresponding to the respective preprocessing execution sections should accumulate the multiplied values in units of a predetermined length of a reception signal. It is also preferable that the communication system should further include memories corresponding to the respective preprocessing execution sections. It is also preferable that the memories should store the plurality of accumulated values which is obtained by the corresponding preprocessing execution sections. It is also preferable that the Fast Fourier Transform section should sequentially perform the Fast Fourier Transform on the plurality of accumulated values stored in the respective memories.

In this case, it is preferable that a spectrum of the reception signal should be spread by a spreading code. It is also preferable that the communication system should further include: a second preprocessing execution section that includes a signal generation section for generating a periodic signal having the same period as the signal generation section of a first preprocessing execution section, in which a reception signal thereof is different in position, which is expressed in units of the predetermined length, from that of the first preprocessing execution section; a correlation point detection section that detects a correlation point of the spreading code on the basis of a result of the Fast Fourier Transform performed by the Fast Fourier Transform section; and a selection section that selects any one of the correlation point, which is detected by the correlation point detection section on the basis of the result of the Fast Fourier Transform performed on the plurality of accumulated values obtained by the first preprocessing execution section, and the correlation point which is detected by the correlation point detection section on the basis of the result of the Fast Fourier Transform performed on the plurality of accumulated values obtained by the second preprocessing execution section.

In this case, it is also preferable that the accumulator section should accumulate the respective multiplied values in units of the predetermined length of the reception signal. It is also preferable that the signal generation section should change the period of the generated periodic signal in units of the predetermined length of the reception signal.

Further, in order to solve the above-mentioned problem, according to another embodiment of the invention, there is provided a signal processing method including the steps of: sampling a reception signal; storing a sampling value, which is obtained by the sampling section, in a memory while executing preprocessing for performing a Fast Fourier Transform in a divided manner; and performing the Fast Fourier Transform in the divided manner on the basis of an output from the memory.

Further, in order to solve the above-mentioned problem, according to a further embodiment of the invention, there is provided a signal processing device including: a sampling section that samples the reception signal; a preprocessing execution section that acquires the sampling value, which is obtained by the sampling section, while executing preprocessing for performing a Fast Fourier Transform in a divided manner; and a Fast Fourier Transform section that performs the Fast Fourier Transform in the divided manner on the basis of an output acquired from the processing execution section.

Further, in order to solve the above-mentioned problem, according to a still further embodiment of the invention, there is provided a movable body equipped with a communication system including a sampling section that samples a reception signal, a preprocessing execution section that acquires a sampling value, which is obtained by the sampling section, while executing preprocessing for performing a Fast Fourier Transform in a divided manner, and a Fast Fourier Transform section that performs the Fast Fourier Transform in the divided manner on the basis of an output acquired from the processing execution section.

As described above, by using the communication system, the signal processing method, the signal processing device, and the movable body according to the embodiments of the invention, it is possible to shorten the time of calculation for the Fast Fourier Transform.

DESCRIPTION OF THE PREFERRED EMBODIMENTS

Figure 1:
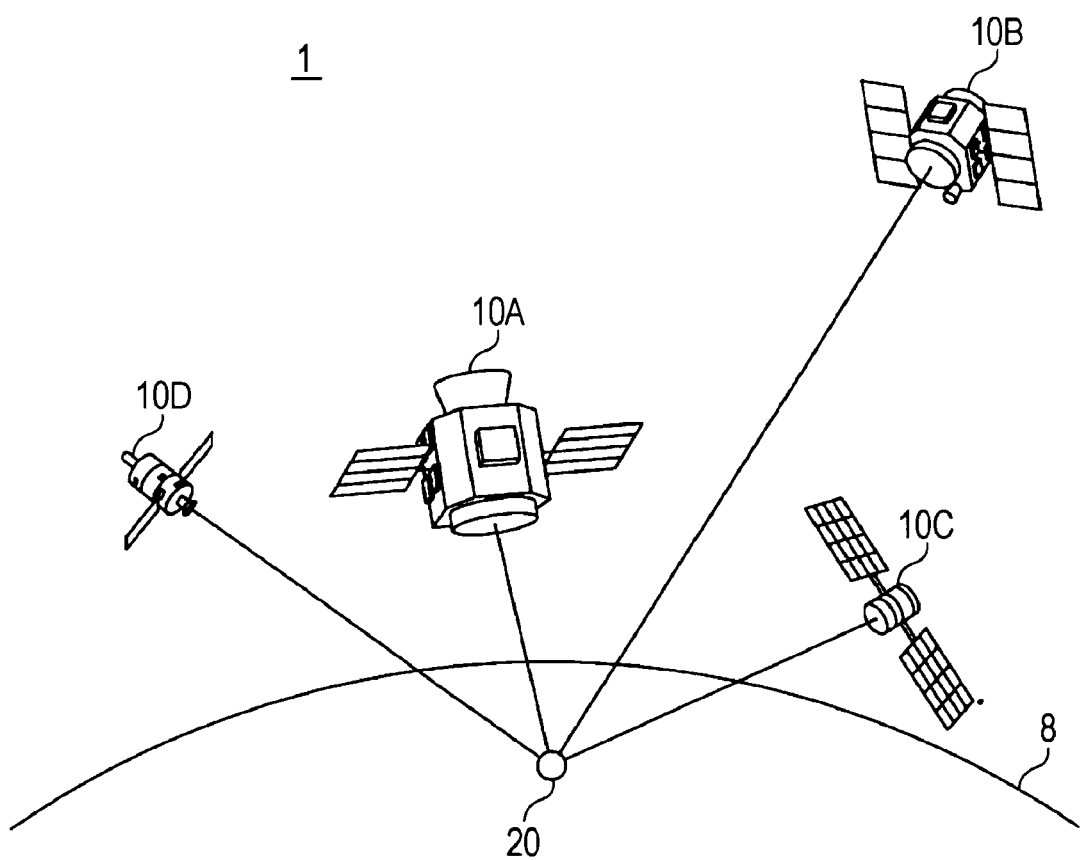
FIG. 1 is an explanatory diagram illustrating a configuration of an artificial satellite system according to an embodiment of the invention.

Hereinafter, preferred embodiments of the invention will be described in detail with reference to the appended drawings. In this specification and the appended drawings, components that have the same function and configuration in practice are denoted with the same reference signs and numerals, and repeated explanation of these components is omitted.

Further, in this specification and the appended drawings, a plurality of components that has the same function and configuration in practice is distinguished by different signs added to the tail of the same reference signs and numerals. For example, the plurality of components that has the same function and configuration in practice is distinguished like artificial satellites 10A, 10B and 10C as necessary. However, in a case where it is not particularly necessary to distinguish the plurality of components that has the same function and configuration in practice, those are denoted with only the same reference numerals and signs. For example, in a case where it is not particularly necessary to distinguish the artificial satellite 10A, 10B and 10C, those are simply referred to as the artificial satellites 10.

The "DETAILED DESCRIPTION OF THE PREFERRED EMBODIMENTS" will be described in the order of items indicated below.

1. Brief Overview of Artificial Satellite System
   1-1. Brief Overview of Position Measurement Based on GPS
   1-2. Configuration of Navigation Message
   1-3. Configuration and Operation of Receiver
2. Background of Embodiments of the Invention
3. First Embodiment
4. Second Embodiment
5. Third Embodiment
6. Fourth Embodiment
7. Fifth Embodiment
8. Advantages of Embodiments of the Invention 1. Brief Overview of Artificial Satellite System First, an artificial satellite system 1 according to the embodiment of the invention will be described with reference to FIGS. 1 to 4.

1-1. Brief Overview of Position Measurement Based on GPS

FIG. 1 is an explanatory diagram illustrating a configuration of the artificial satellite system 1 according to the embodiment. As shown in FIG. 1, the artificial satellite system 1 includes a plurality of artificial satellites 10A to 10D, and a receiver 20.

The artificial satellites 10 (GPS satellites) constitute a measurement satellite system (GNSS: Global Navigation Satellite System), and orbits above the earth 8. Only four artificial satellites 10A to 10D are shown in FIG. 1, but for example a total of 24 artificial satellites, four on each six orbital plane, orbit above the earth 8.

The artificial satellite 10 transmits a navigation message (details are described in "1-2. Configuration of Navigation Message") including orbit information of the artificial satellite, and ephemeris information such as a transmission time of the navigation message. The artificial satellite 10 is provided with an atomic clock, and the transmission time is expressed, for example, in units of one second in accordance with the atomic clock provided in the artificial satellite 10.

In addition the artificial satellite 10 transmits the navigation message by using a spread spectrum signal termed an L1-band C/A code. The spread spectrum signal is a signal in which the spectrum of data of 50 bps is spread out by a pseudo-random series spreading code (hereinafter, referred to as a PRN code) and a carrier of 1,575.42 MHz is BPSK-modulated by using the spread spectrum signal. Further, the PRN code has a code length of 1,023 and a chip rate of 1.023 MHz.

The receiver 20 on the Earth 8 is able to calculate the current position of the apparatus itself on the basis of the received navigation message by receiving the navigation message which is transmitted from the artificial satellites 10A to 10D.

More specifically, the receiver 20 acquires the ephemeris information from the navigation message by receiving the navigation message transmitted from the artificial satellites 10A to 10D. The receiver 20 then calculates the positions of the artificial satellites 10A to 10D from the ephemeris information. The receiver 20 also calculates the distance between the artificial satellites 10A to 10D and the receiver 20 from the difference in the transmission time contained in the ephemeris information and the reception time of the navigation message. Thereafter, the receiver 20 uses the respective calculated positions of the artificial satellites 10A to 10D, and the distance between each artificial satellite 10A to 10D and the receiver 20 so as to calculate an equation having the current three-dimensional position of the receiver 20 as an unknown.

The navigation messages transmitted from the four or more artificial satellites 10 are necessary when calculating the current three-dimensional position of the receiver 20 in such a manner. The reason is that an error exists between the clock (RTC: Real Time Clock) incorporated in the receiver 20 and the atomic clock provided in the artificial satellite 10.

The artificial satellite 10 updates the ephemeris information at a predetermined period, and transmits the navigation message containing the updated ephemeris information. Since the artificial satellite 10 is constantly moving, the error between the position of the artificial satellite 10 calculated on the basis of the ephemeris information and the actual position of the artificial satellite 10 becomes larger with elapse of time from the update of the ephemeris information. Hence, the time of validity of about two hours is set in the ephemeris information which is contained in the navigation message.

The position measurement based on the GPS has been schematically described with reference to FIG. 1. In FIG. 1, the receiver 20 is indicated by a circle as one example of an information processing apparatus. However, the receiver 20 may be an information processing apparatus such as a PC (a Personal Computer), a home video processing device (a DVD recorder, a video cassette recorder, and the like), a mobile telephone, a PHS (a Personal Handyphone System), a portable music reproduction device, a portable video processing device, a PDA (a Personal Digital Assistant), a home game machine, a portable game machine, home electronics, an in-vehicle apparatus, and the like.

Further, the receiver 20 may be mounted on a movable body which is movable with persons and goods loaded therein. For example, a movable body includes automobiles such as a two-wheeled vehicle and various vehicles such as a three-wheeled vehicle, and a bicycle, a bus, an electric train, a Shinkansen, a street car, an airplane, a ship, and a boat.

1-2. Configuration of Navigation Message

Next, the configuration of the navigation message, which is transmitted from the artificial satellite 10, will be described with reference to FIG. 2.

Figure 2:
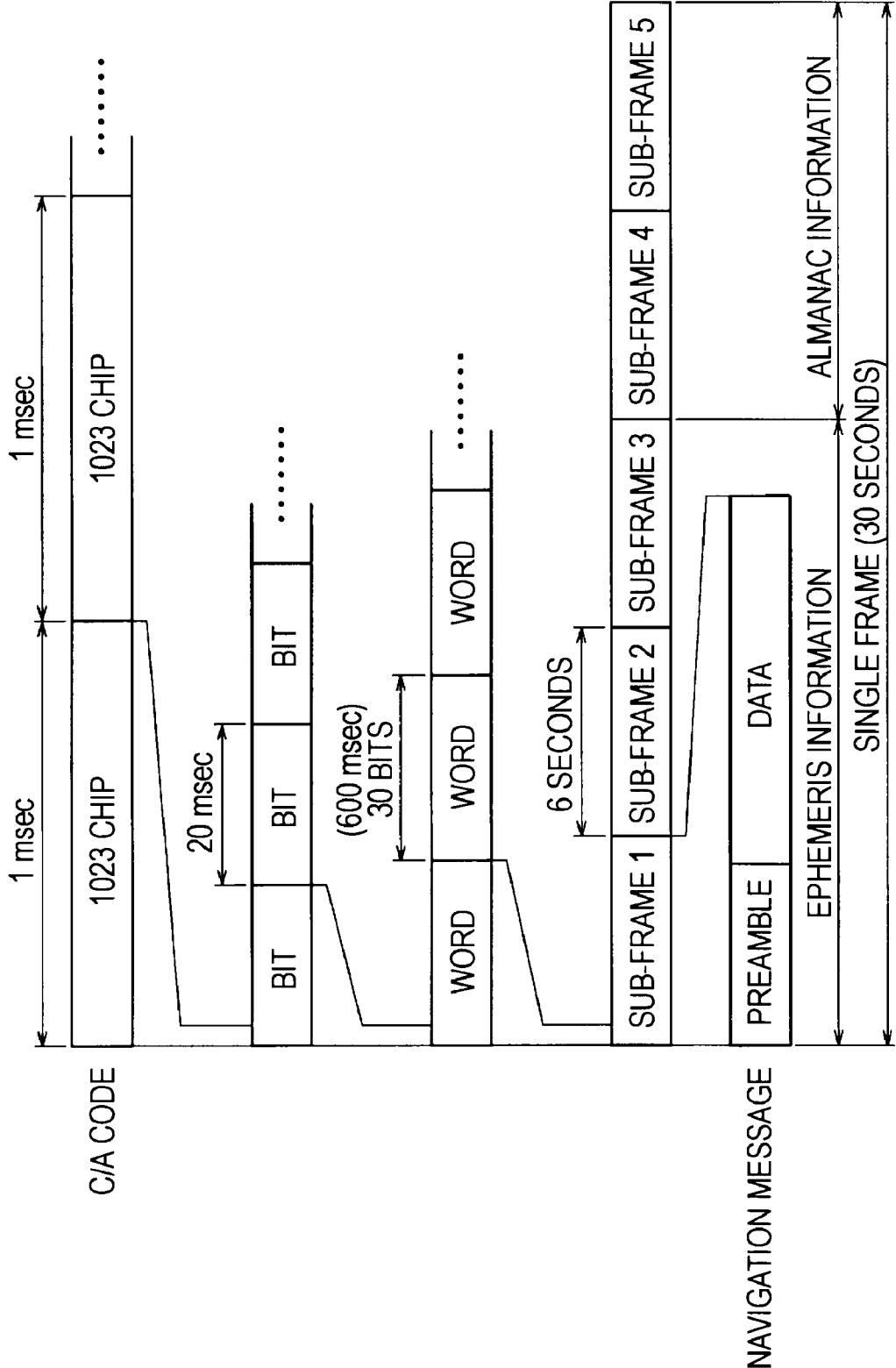
FIG. 2 is an explanatory diagram illustrating a frame configuration of a navigation message.

FIG. 2 is an explanatory diagram illustrating a frame configuration of the navigation message. As shown in FIG. 2, a single frame of the navigation message includes five sub-frames. The length of the single frame is 30 seconds, and has an amount of information of 1500 bits. Further, the first sub-frame 1 to third sub-frame 3 contains parameters for calculating factors such as a long radius of the orbit, an eccentricity, a mean anomaly, a longitude of ascending node, an argument of perigee, and an angle of orbit inclination and the ephemeris information such as a transmission time toc of the navigation message. On the other hand, the fourth sub-frame 4 and fifth sub-frame 5 contain almanac information common to all the artificial satellites 10. The almanac information includes information on the six factors of all the artificial satellites 10, information as to which artificial satellite 10 is available, and the like.

Further, each sub-frame contains data following a preamble which is a fixed pattern. Each sub-frame includes ten words. The length of each sub-frame is six seconds, and has an amount of information of 300 bits.

Further, each word includes 30 bits, and the length thereof is 600 msec. Further, the length of each bit is 20 msec corresponding to 20 periods of the C/A code (the spreading code). Accordingly, the transmission rate of the data is 50 bps. Further, as shown in FIG. 2, a single period of the C/A code is 1 msec, and the code includes 1023 chip of the PRN code.

1-3. Configuration and Operation of Receiver

Figure 3:
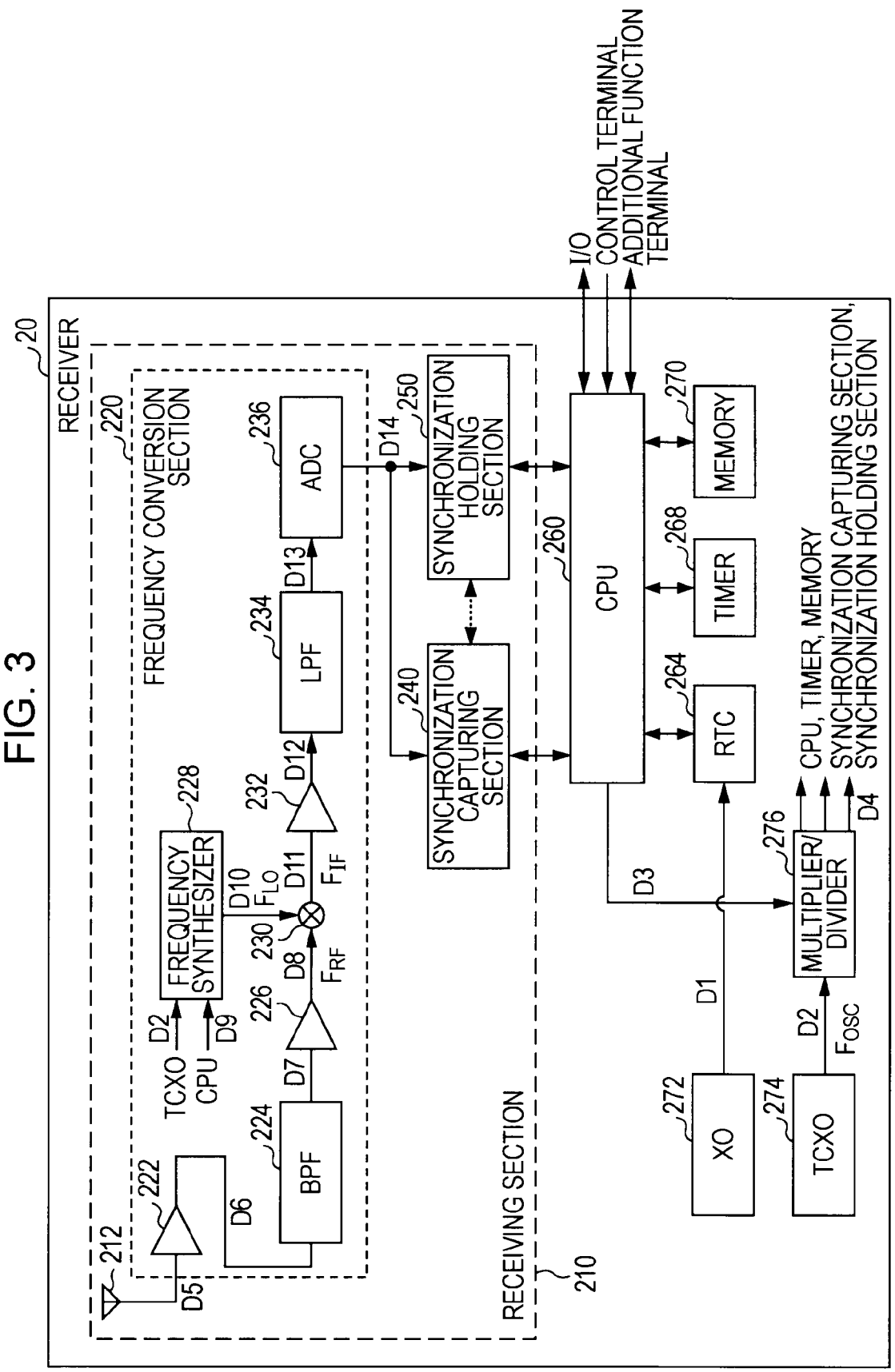
FIG. 3 is an explanatory diagram illustrating a hardware configuration of a receiver according to the embodiment of the invention.

FIG. 3 is an explanatory diagram illustrating a hardware configuration of the receiver 20 according to the embodiment. As shown in FIG. 3, the receiver 20 includes: a receiving section 210 having an antenna 212, a frequency converting section 220, a synchronization capturing section 240, and a synchronization holding section 250; a CPU (Central Processing Unit) 260; an RTC (Real Time Clock) 264; a timer 268; a memory 270; an XO (X'tal Oscillator) 272; a TCXO (Temperature Compensated X'tal Oscillator) 274; and a multiplier/divider 276.

The XO 272 oscillates a signal D1 having a predetermined frequency (for example, about 32.768 kHz), and provides the oscillated signal D1 to the RTC 264. The TCXO 274 oscillates a signal D2 having a frequency (for example, about 16.368 MHz) different from the XO 272, and provides the oscillated signal D2 to the multiplier/divider 276 or a frequency synthesizer 228.

The multiplier/divider 276 performs multiplication, division, or both on the signal D2 provided from the TCXO 274 on the basis of an instruction from the CPU 260. The multiplier/divider 276 provides the signal D4 performed with multiplication, division, or both to the frequency synthesizer 228 of the frequency converting section 220, the CPU 260, the timer 268, the memory 270, the synchronization capturing section 240, and the synchronization holding section 250.

The antenna 212 receives a radio signal (for example, an RF signal in which a carrier of 1575.42 MHz is spread out) such as the navigation message which is transmitted from the artificial satellite 10, converts the radio signal to an electric signal D5, and provides the electric signal D5 to the frequency converting section 220.

The frequency converting section 220 includes an LNA (Low Noise Amplifier) 222, a BPF (Band Pass Filter) 224, an amplifier 226, a frequency synthesizer 228, a multiplier 230, an amplifier 232, an LPF (Low Pass Filter) 234, and an ADC (Analog Digital Converter) 236. As described below, the frequency conversion section 220 down-converts the signal D5 having a high frequency of 1575.42 MHz received by the antenna 212 into the signal D14 having a frequency of, for example, about 1.023 MHz in order to facilitate the digital signal processing.

The LNA 222 amplifies the signal D5 provided from the antenna 212, and provides the same to the BPF 224. The BPF 224 including a SAW filter (Surface Acoustic Wave Filter) extracts only a specific frequency component of the frequency components of the signal D6 amplified by the LNA, and provides the same to the amplifier 226. The amplifier 226 amplifies the signal D7 (a frequency $F_{RF}$) having the frequency component extracted by the BPF 224, and provides the same to the multiplier 230.

The frequency synthesizer 228 generates a signal D10 having the frequency $F_{LO}$ on the basis of the instruction D9 from the CPU 260 by using the signal D2 provided from the TCXO 274. The frequency synthesizer 228 provides the generated signal D10 having the frequency $F_{LO}$ to the multiplier 230.

The multiplier 230 multiples the signal D8 having the frequency $F_{RF}$ provided from the amplifier 226 and the signal D10 having the frequency $F_{LO}$ provided from the frequency synthesizer 228. That is, the multiplier 230 down-converts the high frequency signal into the IF (Intermediate Frequency) signal D11 (for example, an intermediate frequency signal having a frequency of about 1.023 MHz).

The amplifier 232 amplifies the IF signal D11 down-converted by the multiplier 230, and provides the same to the LPF 234.

The LPF 234 extracts the low frequency component of the frequency components of the IF signal D12 amplified by the amplifier 232, and provides the signal D13 having the extracted low frequency component to the ADC 236. FIG. 3 shows an example in which the LPF 234 is disposed between the amplifier 232 and the ADC 236, but the BPF may be disposed between the amplifier 232 and the ADC 236.

The ADC 236 (the sampling section) samples the IF signal D13 of analog format provided from the LPF 234 and converts the IF signal D13 to digital format, and provides the IF signal D14, which is converted into digital format, to the synchronization capturing section 240 and the synchronization holding section 250.

The synchronization capturing section 240 performs synchronization capturing of the PRN code of the IF signal D14, which is provided from the ADC 236, by using the signal D4, which is provided from the multiplier/divider 276, on the basis of the control by the CPU 260, and detects the IF frequency of the IF signal D14. Then, the synchronization capturing section 240 provides the phase of the PRN code, the carrier frequency of the IF signal D14, and the like to the synchronization holding section 250 and the CPU 260.

The synchronization holding section 250 performs synchronization holding of the PRN code and the carrier of the IF signal D14, which is provided from the ADC 236, by using the signal D4, which is provided from the multiplier/divider 276, on the basis of the control by the CPU 260. More specifically, the synchronization holding section 250 operates with the phase of the PRN code, the carrier frequency of the IF signal D14, and the like provided from the synchronization capturing section 240 as initial values. The synchronization holding section 250 demodulates the navigation message contained in the IF signal D14 which is provided from the ADC 236, and provides the same to the CPU 260. In addition, the synchronization holding section 250 includes a plurality of channel circuits, and each of the channel circuits performs the synchronization holding of the signal which is transmitted from the corresponding artificial satellite 10, and demodulates the navigation message.

The CPU 260 calculates the position and speed of each artificial satellite 10 on the basis of the navigation message which is provided from the synchronization holding section 250, and calculates the position of the receiver 20. The CPU 260 corrects the time information of the RTC 264 on the basis of the navigation message, or performs various controls in connection with a control terminal, an I/O terminal, and an added function terminal.

The RTC 264 measures a time by using the signal D1 having the predetermined frequency provided from the XO 272. The time measured by the RTC 264 is appropriately corrected by the CPU 260.

The timer 268 keeps time by using the signal D4 which is provided from the multiplier/divider 276. Such timer 268 is referenced when determining the start timing of various controls performed by the CPU 260. For example, the CPU 260 references the timer 268 when determining the start timing of the operation of the PRN code generator of the synchronization holding section 250 on the basis of the PRN code which is captured by the synchronization capturing section 240.

The memory 270 includes a RAM (Random Access Memory), a ROM (Read-Only Memory) and the like, and functions as a working space of the CPU 260, a storage section of a program, a storage section of the navigation message, and the like. In the memory 270, the RAM is used as a working area for performing various processing performed by the CPU 260 and the like. Further, the RAM is employed for buffering various data and for holding the ephemeris and almanac information as the orbit information of the artificial satellite 10 obtained from the synchronization holding section 250, intermediate data generated in the process of calculation, and result data of the calculation. Further, in the memory 270, the ROM is used as a section for storing various programs, fixed data, and the like. Furthermore, in the memory 270, the nonvolatile memory may be used as a section for storing the ephemeris and almanac information as the orbit information of the artificial satellite 10, the position information of the position measurement result, an amount of error of the TCXO 12, and the like, even when the power of the receiver 20 is off.

In addition, a configuration excluding the XO 272, the TCXO 274, the antenna 212, the LNA 222, and the BPF 224 from the configuration of the receiver 20 shown in FIG. 3 can be made on an integrated circuit formed as a single chip.

Subsequently, an operation example of the above-mentioned receiver 20 will be described with reference to FIG. 4.

Figure 4:
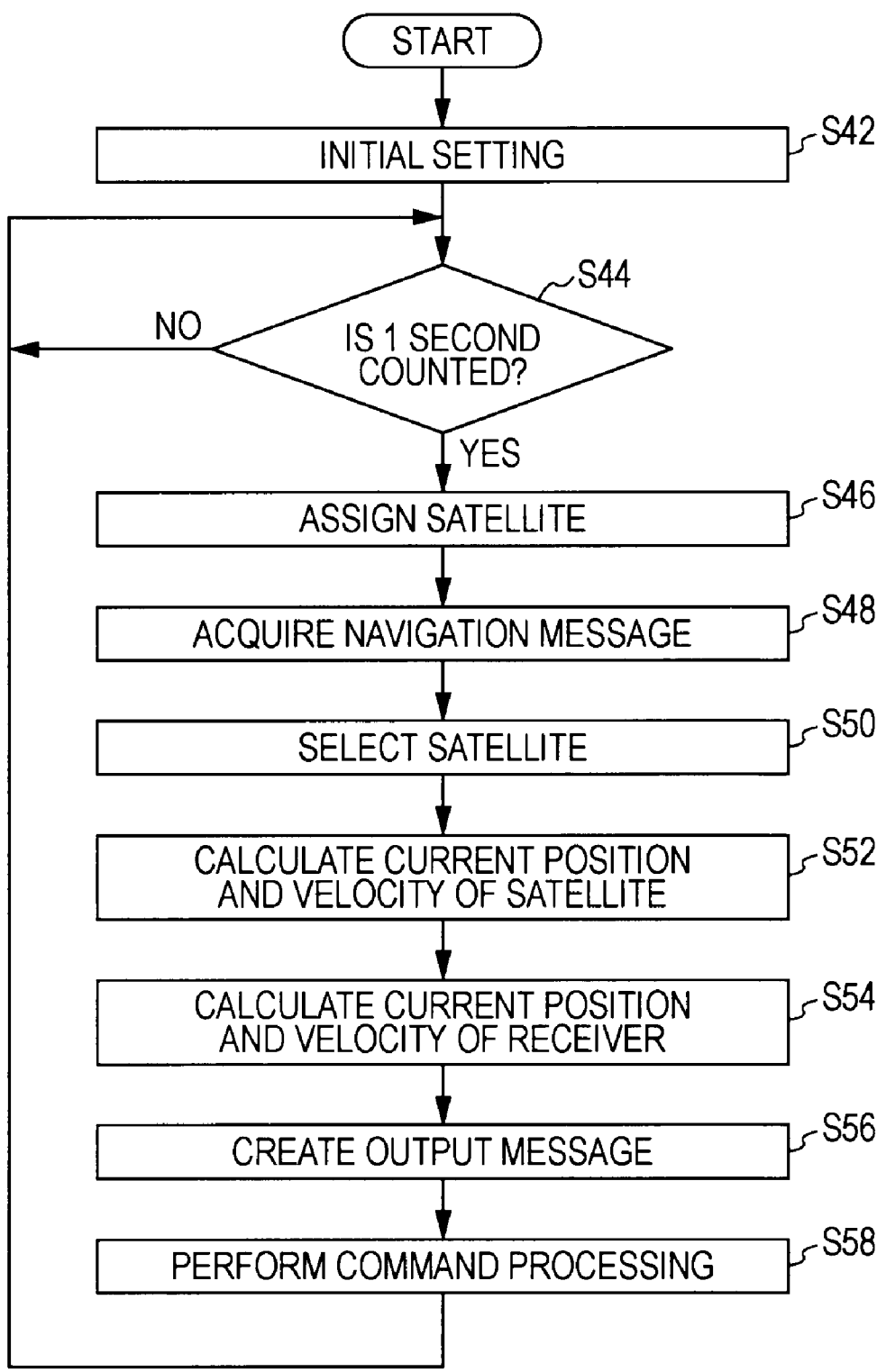
FIG. 4 is a flowchart illustrating a flow of an operation example of the receiver according to the embodiment of the invention.

FIG. 4 is a flowchart illustrating the flow of the operation example of the receiver 20 according to the embodiment of the invention. As shown in FIG. 4, when the receiver 20 is activated, the CPU 260 performs an initial setting (S42). Subsequently, when one second is counted by the RTC 264 (S44), the CPU 260 allocates the artificial satellite 10 to each channel circuit included in the synchronization holding section 250 (S46).

Thereafter, when the navigation message is acquired by the receiving section 210 (S48), the CPU 260 selects at least four or more artificial satellites 10 to actually capture (S50). Then, the CPU 260 calculates the current position and the speed of the selected artificial satellite 10 (S52), and calculates the current position and the speed of the receiver 20 on the basis of the calculated current position and the speed of the artificial satellite 10 (S54).

Subsequently, the CPU 260 creates an output message representing the calculated current position and the speed of the receiver 20 (S56), and executes command processing corresponding to the output message, and the flow then returns to the processing of step S44 (S58).

2. Background of Embodiments of the Invention

Next, the background of the embodiment of the invention will be described with reference to FIG. 5.

Figure 5:
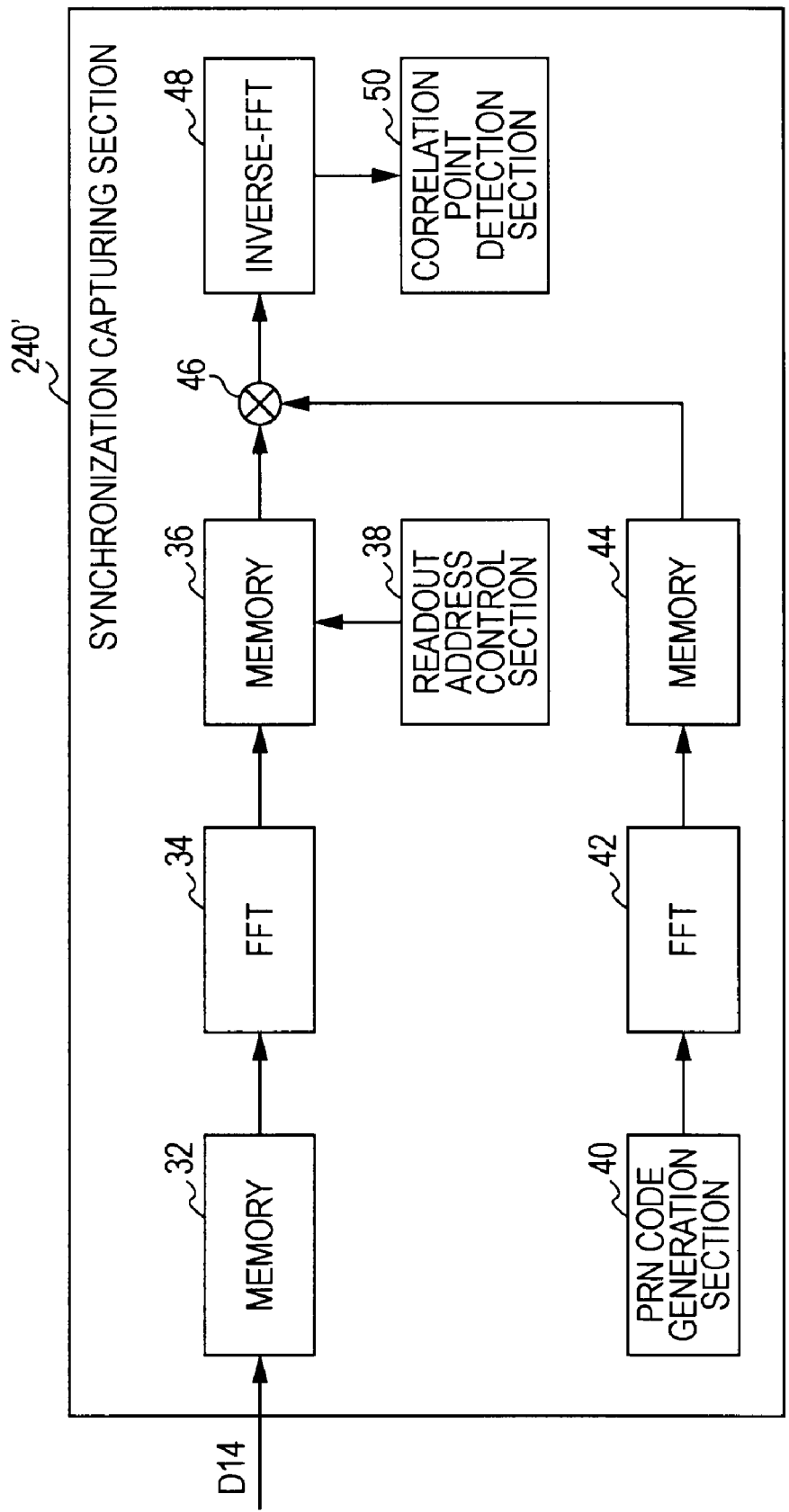
FIG. 5 is an explanatory diagram illustrating a configuration of a synchronization capturing section according to the embodiment of the invention.

FIG. 5 is an explanatory diagram illustrating a configuration of a synchronization capturing section 240' according to the embodiment of the invention. As shown in FIG. 5, the synchronization capturing section 240' according to the embodiment of the invention includes a memory 32, an FFT 34, a memory 36, a readout address control section 38, a PRN code generation section 40, an FFT 42, a memory 44, a multiplier 46, an inverse-FFT 48, and a correlation point detection section 50.

As shown in FIG. 5, the IF signal D14, which is provided from the ADC 236, is stored in the memory 32, and the FFT 34 performs a Fast Fourier Transform on the IF signal D14 which is stored in the memory 32. The result of the Fast Fourier Transform performed by the FFT 34 is stored in the memory 36. The result of the Fast Fourier Transform stored in the memory 36 is sequentially provided to the multiplier 46 on the basis of the control performed by the readout address control section 38.

On the other hand, the PRN code generation section 40 generates the PRN code used in spreading the reception signal, and the FFT 42 performs the Fast Fourier Transform on the PRN code which is generated by the PRN code generation section 40. The result of the Fast Fourier Transform performed by the FFT 42 is stored in the memory 44.

The multiplier 46 multiplies complex conjugates of the result of the Fast Fourier Transform provided from the memory 36 and the result of the Fast Fourier Transform provided from the memory 44. That is, the multiplier 46 calculates a degree of correlation between the PRN code of the reception signal and the PRN code generated by the PRN code generation section 40 in the frequency domain.

The inverse-FFT 48 performs the Inverse Fast Fourier Transform on the multiplied result provided from the multiplier 46. The result of the Inverse Fast Fourier Transform performed by the inverse-FFT 48 shows the correlation between the PRN code of the reception signal and the PRN code generated by the PRN code generation section 40 in the time domain. The correlation point detection section 50 detects a correlation point, at which the PRN code of the reception signal is synchronized with the PRN code generated by the PRN code generation section 40, on the basis of the result of the Inverse Fast Fourier Transform.

Here, the FFT 34 may perform L times (L is an integer) the Fast Fourier Transform for obtaining a 1/L frequency component of the entire frequency so as to obtain the entire frequency components. In this case, the multiplier 46 is able to update the memory 36 from results of new Fast Fourier Transforms by multiplying the previous results of the Fast Fourier Transforms which are being stored in the memory 36 while the new Fast Fourier Transforms are performed. Accordingly, by performing the Fast Fourier Transform in a divided manner, it is possible to reduce the volume of the memory 36.

However, the Fast Fourier Transform performed L times by the FFT 34 includes a lot of repeated calculations. Accordingly, when the FFT 34 solely performs the Fast Fourier Transform in the divided manner, a problem arises in that the amount and the calculation time increase.

For this reason, in consideration of the above-mentioned situation, the receiver 20 according to the embodiment of the invention was made. The receiver 20 according to the embodiment of the invention is able to shorten the calculation time for the Fast Fourier Transform. Hereinafter, the first to fifth embodiments of the receiver 20 will be described.

3. First Embodiment

In the actual receiver 20, for example, the ADC 236 performs the sampling with 4.096 MHz, and the synchronization capturing section 240 performs the Fast Fourier Transform on the sampling value corresponding to several milliseconds obtained by the ADC 236 as an input data. However, in the following description, an example in which the Fast Fourier Transform is performed by using 16 pieces of input data is given for convenience of description.

Figure 6:
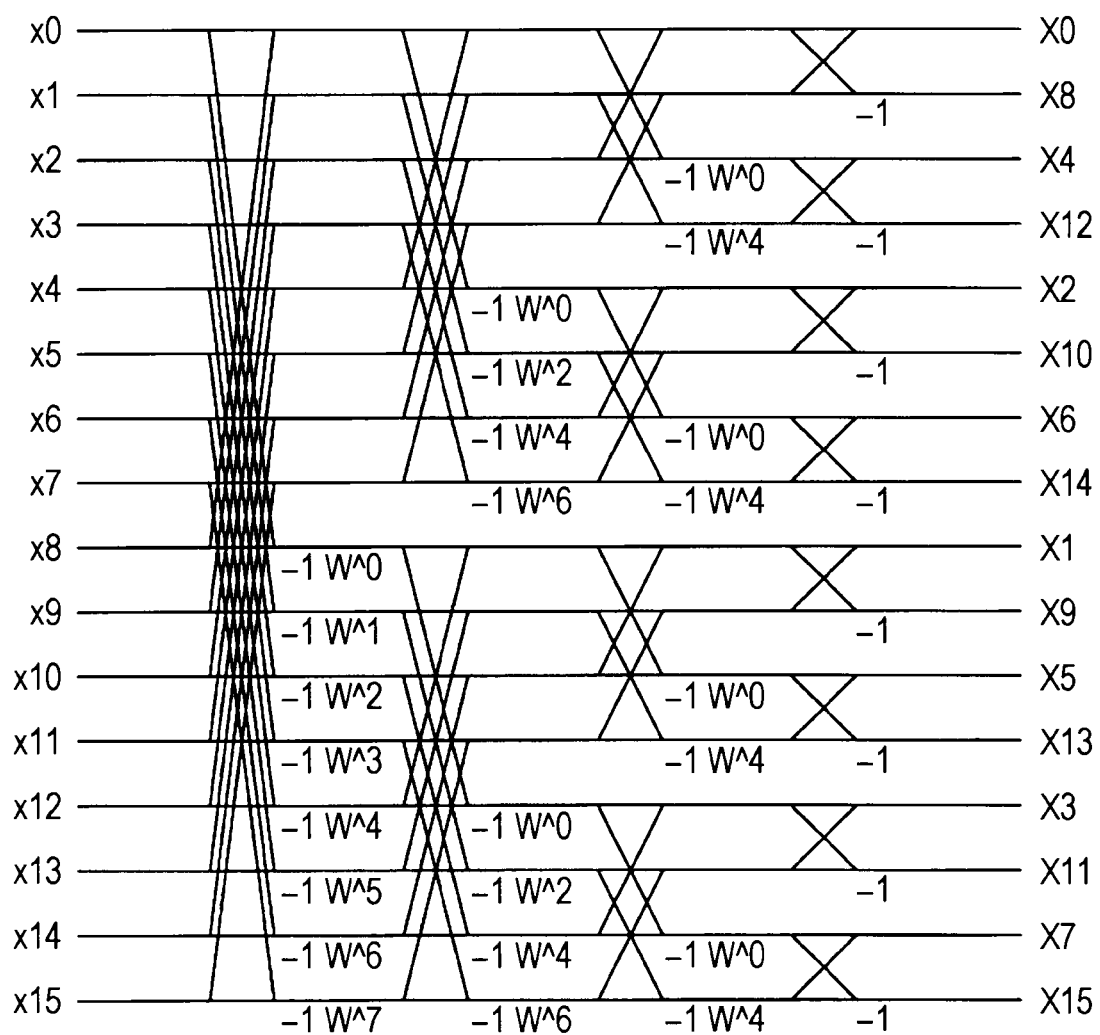
FIG. 6 is an explanatory diagram illustrating a flow of a calculation of a Fast Fourier Transform in a case where the number of input data is 16.

FIG. 6 is an explanatory diagram illustrating a flow of the calculation of the Fast Fourier Transform in a case where the number of input data is 16. The input data x0 to x15 in the time domain is converted into the output data X0 to X15 in the frequency domain by the calculation shown in FIG. 6. In addition, the "W" in FIG. 6 is "exp(−j2π/16)".

On the other hand, as shown in FIGS. 7 to 10, it is possible to obtain the output data X0 to X15 by performing the Fast Fourier Transform divided into four.

Figure 7:
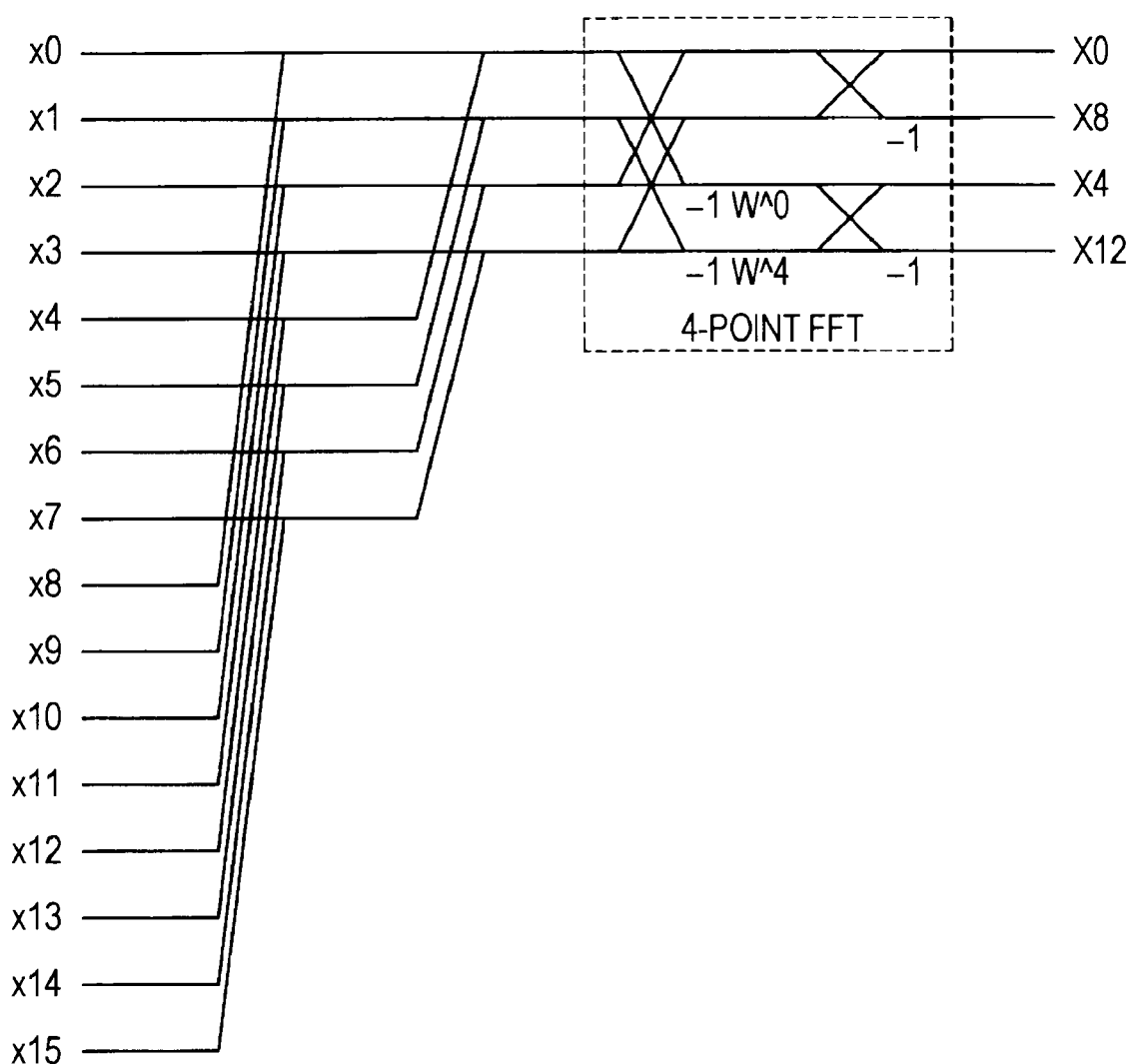
FIG. 7 is an explanatory diagram illustrating the flow of the calculation in a case where the Fast Fourier Transform is performed in a divided manner.
Figure 8:
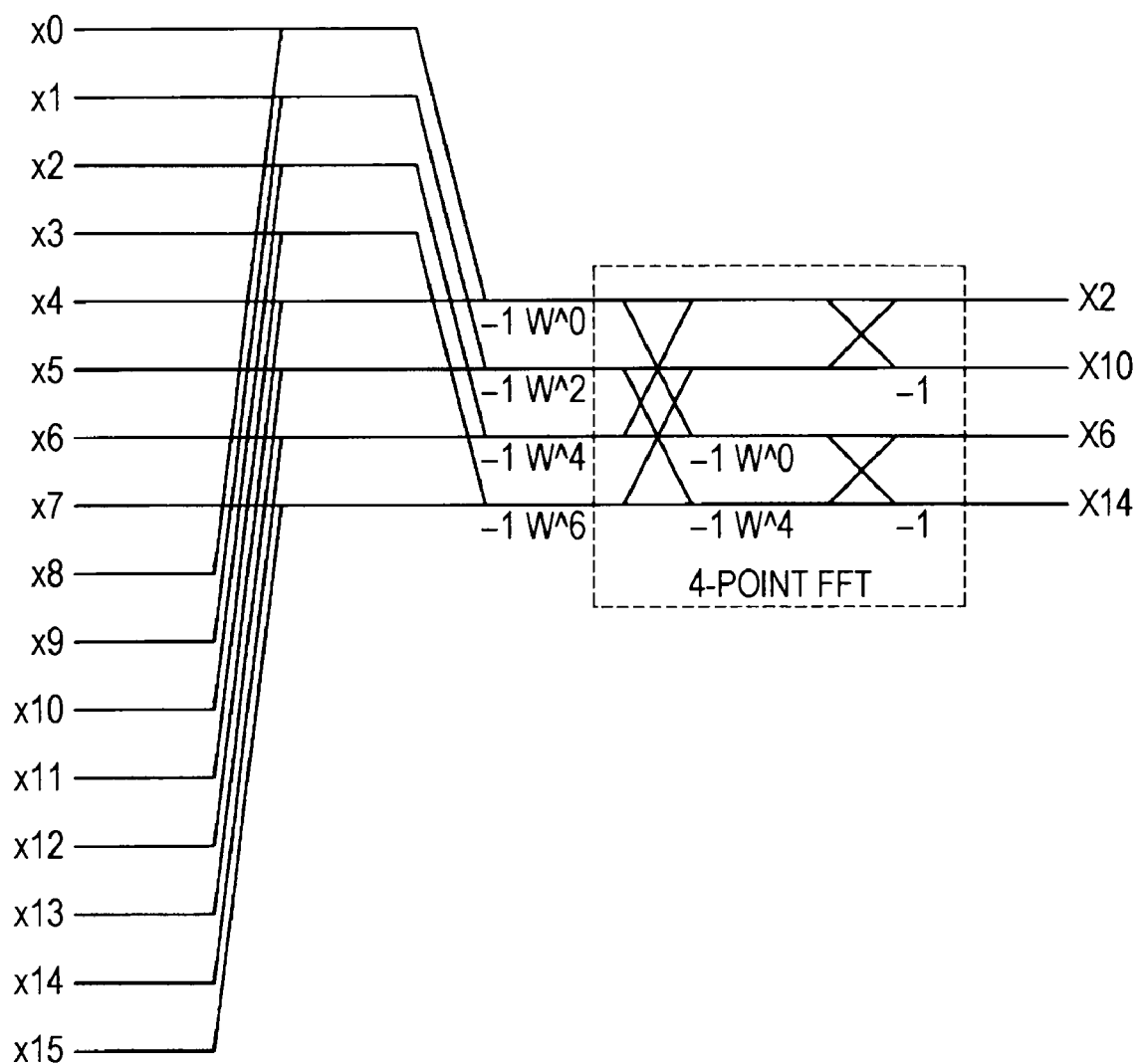
FIG. 8 is an explanatory diagram illustrating the flow of the calculation in the case where the Fast Fourier Transform is performed in the divided manner.
Figure 9:
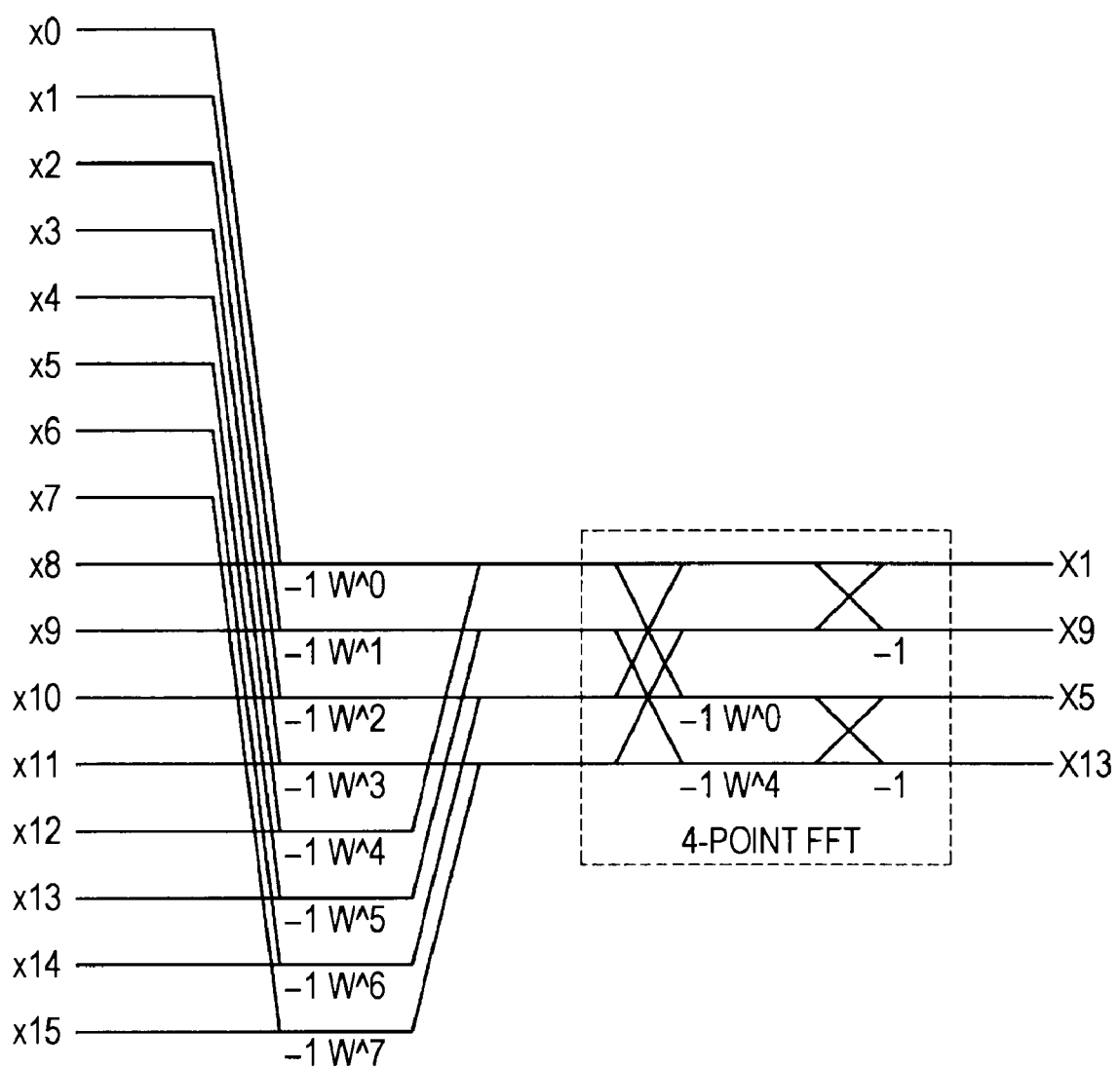
FIG. 9 is an explanatory diagram illustrating the flow of the calculation in the case where the Fast Fourier Transform is performed in the divided manner.
Figure 10:
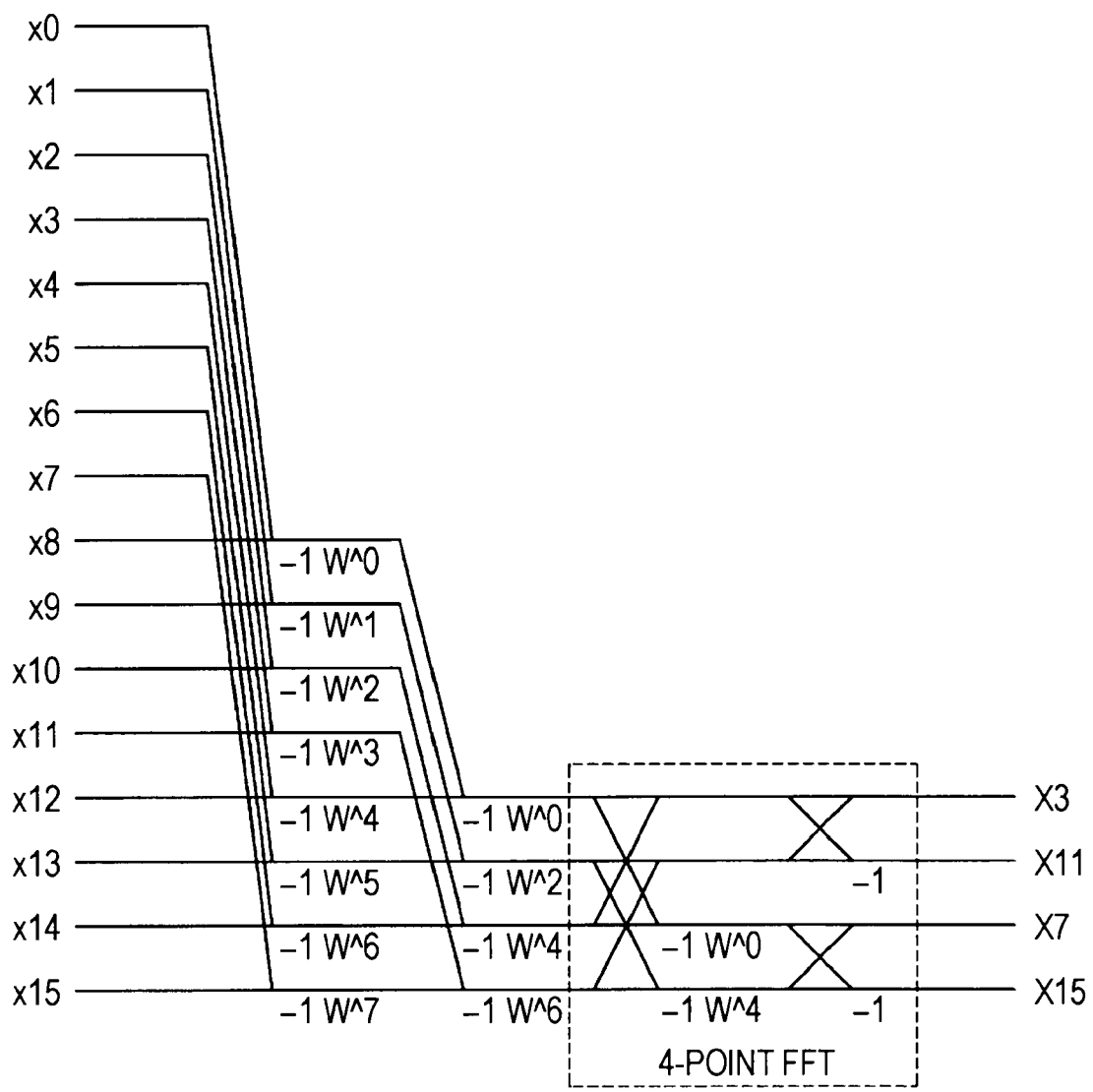
FIG. 10 is an explanatory diagram illustrating the flow of the calculation in the case where the Fast Fourier Transform is performed in the divided manner.

FIGS. 7 to 10 are explanatory diagrams illustrating the flow of the calculation in the case where the Fast Fourier Transform is performed in the divided manner. Specifically, FIG. 7 shows calculation for obtaining the output data X0, X8, X4 and X12, and FIG. 8 shows calculation for obtaining the output data X2, X10, X6 and X14. Likewise, FIG. 9 shows calculation for obtaining the output data X1, X9, X5 and X13, and FIG. 10 shows calculation for obtaining the output data X3, X11, X7 and X15.

Figure 11:
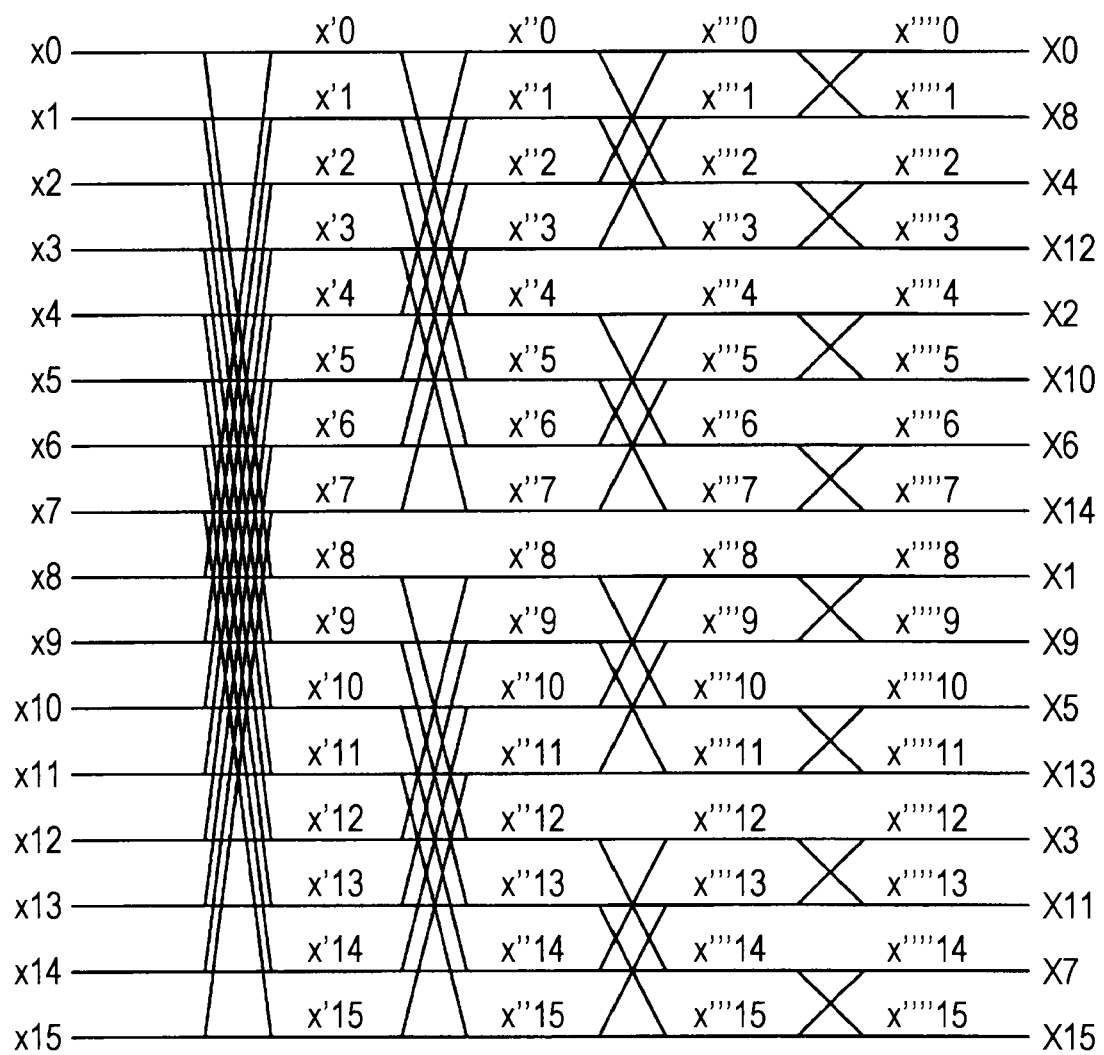
FIG. 11 is an explanatory diagram defining intermediate data which can be obtained in the process of the calculation of the Fast Fourier Transform.

Here, each intermediate data obtained in the process of the calculation is defined as described in FIG. 11. In this case, the intermediate data x"4 to x"7 as an input to the Fast Fourier Transform for obtaining the output data X2, X10, X6 and X14 shown in FIG. 8 are expressed as follows (W^0=W^16=1, W^8=−1).

Numerical Expression 1

$$x''4 = (x'0 - x'4) \times w^{\wedge}0$$
$$= ((x0 + x8) - (x4 + x12)) \times w^{\wedge}0$$
$$= x0 \times w^{\wedge}0 + x4 \times w^{\wedge}8 + x8 \times w^{\wedge}0 + x12 \times w^{\wedge}8$$

$$x''5 = (x'1 - x'5) \times w^{\wedge}2$$
$$= ((x1 + x9) - (x5 + x13)) \times w^{\wedge}2$$
$$= x1 \times w^{\wedge}2 + x5 \times w^{\wedge}10 + x9 \times w^{\wedge}2 + x13 \times w^{\wedge}10$$

$$x''6 = (x'2 - x'6) \times w^{\wedge}4$$
$$= ((x2 + x10) - (x6 + x14)) \times w^{\wedge}4$$
$$= x2 \times w^{\wedge}4 + x6 \times w^{\wedge}12 + x10 \times w^{\wedge}4 + x14 \times w^{\wedge}12$$

$$x''7 = (x'3 - x'7) \times w^{\wedge}6$$
$$= ((x3 + x11) - (x7 + x15)) \times w^{\wedge}6$$
$$= x3 \times w^{\wedge}6 + x7 \times w^{\wedge}14 + x11 \times w^{\wedge}6 + x15 \times w^{\wedge}14$$

The calculation for obtaining the intermediate data x"4 to x"7 is equivalent to the process of multiplying the input data and the signal of which the phase is changed by W^2 for each input data and accumulating the multiplied values at an interval corresponding to four pieces of the data. In addition, the accumulation interval of the multiplied values is input-data-number/division-number. Hence, in the embodiment in which the input data number is 16 and the division number is 4, the interval corresponds to the four pieces.

Likewise, the intermediate data x"0 to x"3 as an input to the Fast Fourier Transform for obtaining the output data X0, X8, X4 and X12 shown in FIG. 7 are expressed as the following Numerical Expression 2.

Numerical Expression 2

$$x''0 = (x'0 + x'4)$$
$$= (x0 + x8) + (x4 + x12)$$
$$= x0 \times w^{\wedge}0 + x4 \times w^{\wedge}0 + x8 \times w^{\wedge}0 + x12 \times w^{\wedge}0$$

$$x''1 = (x'1 + x'5)$$
$$= (x1 + x9) + (x5 + x13)$$
$$= x1 \times w^{\wedge}0 + x5 \times w^{\wedge}0 + x9 \times w^{\wedge}0 + x13 \times w^{\wedge}0$$

$$x''2 = (x'2 + x'6)$$
$$= (x2 + x10) + (x6 + x14)$$
$$= x2 \times w^{\wedge}0 + x6 \times w^{\wedge}0 + x10 \times w^{\wedge}0 + x14 \times w^{\wedge}0$$

$$x''3 = (x'3 + x'7)$$
$$= (x3 + x11) + (x7 + x15)$$
$$= x3 \times w^{\wedge}0 + x7 \times w^{\wedge}0 + x11 \times w^{\wedge}0 + x15 \times w^{\wedge}0$$

The calculation for obtaining the intermediate data x"0 to x"3 is equivalent to the process of multiplying the input data and the signal of which the phase is not changed (or the signal of which the phase is changed by W^16 for each input data) and accumulating the multiplied values at an interval corresponding to four pieces of the data.

Further, the intermediate data x"8 to x"11 as an input to the Fast Fourier Transform for obtaining the output data X2, X10, X6 and X14 are expressed as the following Numerical Expression 3.

Numerical Expression 3

$$x''8 = (x'8 + x'12)$$
$$= (x0 - x8) \times w^{\wedge}0 + (x4 - x12) \times w^{\wedge}4$$
$$= x0 \times w^{\wedge}0 + x4 \times w^{\wedge}4 + x8 \times w^{\wedge}8 + x12 \times w^{\wedge}12$$

$$x''9 = (x'9 + x'13)$$
$$= (x1 - x9) \times w^{\wedge}1 + (x5 - x13) \times w^{\wedge}5$$
$$= x1 \times w^{\wedge}1 + x5 \times w^{\wedge}5 + x9 \times w^{\wedge}9 + x13 \times w^{\wedge}13$$

$$x''10 = (x'10 + x'14)$$
$$= (x2 - x10) \times w^{\wedge}2 + (x6 - x14) \times w^{\wedge}6$$
$$= x2 \times w^{\wedge}2 + x6 \times w^{\wedge}6 + x10 \times w^{\wedge}10 + x14 \times w^{\wedge}14$$

$$x''11 = (x'11 + x'15)$$
$$= (x3 - x11) \times w^{\wedge}3 + (x7 - x15) \times w^{\wedge}7$$
$$= x3 \times w^{\wedge}3 + x7 \times w^{\wedge}7 + x11 \times w^{\wedge}11 + x15 \times w^{\wedge}15$$

The calculation for obtaining the intermediate data x"8 to x"11 is equivalent to the process of multiplying the input data and the signal of which the phase is changed by W^1 for each input data and accumulating the multiplied values at an interval corresponding to four pieces of the data.

Further, the intermediate data x"12 to x"15 as an input to the Fast Fourier Transform for obtaining the output data X3, X11, X7 and X15 are expressed as the following Numerical Expression 4.

Numerical Expression 4

$$x''12 = (x'8 - x'12) \times w^{\wedge}0$$
$$= ((x0 - x8) \times w^{\wedge}0 - (x4 - x12) \times w^{\wedge}4) \times w^{\wedge}0$$
$$= x0 \times w^{\wedge}0 + x4 \times w^{\wedge}12 + x8 \times w^{\wedge}8 + x12 \times w^{\wedge}4$$

$$x''13 = (x'9 - x'13) \times w^{\wedge}2$$
$$= ((x1 - x9) \times w^{\wedge}1 - (x5 - x13) \times w^{\wedge}5) \times w^{\wedge}2$$
$$= x1 \times w^{\wedge}3 + x5 \times w^{\wedge}15 + x9 \times w^{\wedge}11 + x13 \times w^{\wedge}7$$

$$x''14 = (x'10 - x'14) \times w^{\wedge}4$$
$$= ((x2 - x10) \times w^{\wedge}2 - (x6 - x14) \times w^{\wedge}6) \times w^{\wedge}4$$
$$= x2 \times w^{\wedge}6 + x6 \times w^{\wedge}2 + x10 \times w^{\wedge}14 + x14 \times w^{\wedge}10$$

$$x''15 = (x'11 - x'15) \times w^{\wedge}6$$
$$= ((x3 - x11) \times w^{\wedge}3 - (x7 - x15) \times w^{\wedge}7) \times w^{\wedge}6$$
$$= x3 \times w^{\wedge}9 + x7 \times w^{\wedge}5 + x11 \times w^{\wedge}1 + x15 \times w^{\wedge}13$$

The calculation for obtaining the intermediate data x"12 to x"15 is equivalent to the process of multiplying the input data and the signal of which the phase is changed by W^3 for each input data and accumulating the multiplied values at an interval corresponding to four pieces of the data.

As described above, when the Fast Fourier Transform is performed in the divided manner, the intermediate data x"0 to x"15 subjected to the Fast Fourier Transform can be obtained through the predetermined preprocessing. The synchronization capturing section 240 according to the embodiment is able to shorten the time of the processing for obtaining the results of the Fast Fourier Transform performed on the entire frequency components by acquiring the input data provided as the IF signal D14 from the ADC 236 and performing the predetermined preprocessing. Hereinafter, detailed configuration and operation of the synchronization capturing section 240 will be described.

3-1. Configuration of Synchronization Capturing Section

Figure 12:
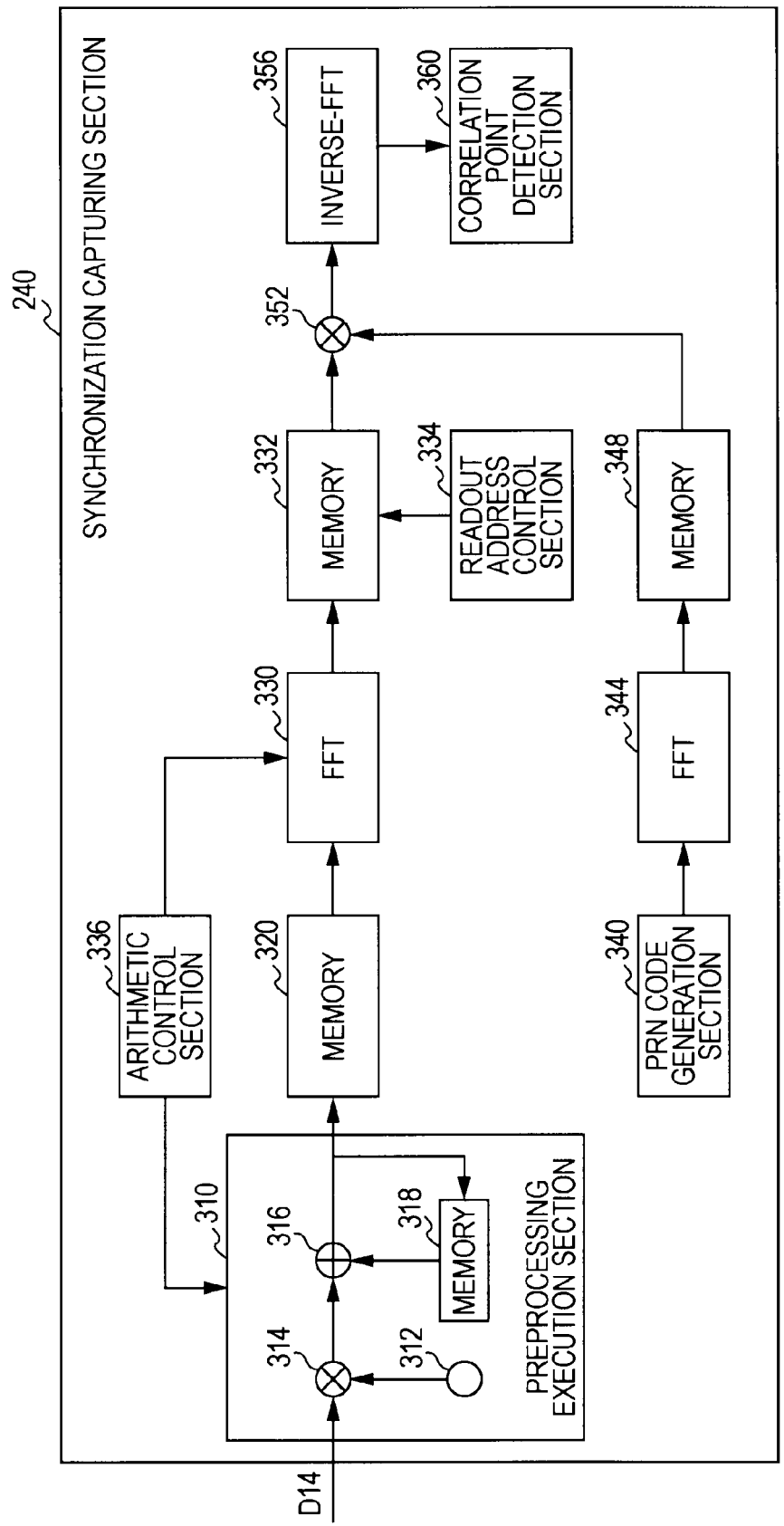
FIG. 12 is an explanatory diagram illustrating a configuration of a synchronization capturing section according to a first embodiment.

FIG. 12 is an explanatory diagram illustrating a configuration of the synchronization capturing section 240 according to the first embodiment. As shown in FIG. 12, the synchronization capturing section 240 according to the first embodiment includes: a preprocessing execution section 310; a memory 320; an FFT 330; a memory 332; a readout address control section 334; an arithmetic control section 336; a PRN code generation section 340; an FFT 344 (the Fast Fourier Transform section); a memory 348; a multiplier 352; an inverse-FFT 356; and a correlation point detection section 360.

Further, the preprocessing execution section 310 includes a signal generation section 312, a multiplier section 314, an adder section 316, and a memory 318. The preprocessing execution section 310 executes the preprocessing for performing the Fast Fourier Transform in the divided manner.

The signal generation section 312 generates a periodic signal having a period which is designated by the arithmetic control section 336. Then, the multiplier section 314 multiplies the IF signal D14 which is provided as an input data from the ADC 236 and the periodic signal which is generated by the signal generation section 312. In other words, the multiplier section 314 multiplies the input data and the signal of which the phase is changed by a predetermined amount for each input data (for each a sampling interval).

The adder section 316 and the memory 318 functions as an accumulator section for accumulating the multiplied value, which is obtained by the multiplier section 314, at a predetermined interval in the order which is obtained by the multiplier section 314. Specifically, the adder section 316 adds the multiplied value, which is obtained by the multiplier section 314, to the accumulated value which is read from a certain address of the memory 318, and repeats the process of updating the accumulated value of the address, in a way that the address of the memory 318 is deviated one by one, on the basis of the added result.

For example, the memory 318 is configured to store the four pieces of data, and the signal generation section 312 generates the periodic signal of which the phase is changed by $W^2$ for each input data. In this case, when the number of the input data is 16, it is possible to obtain the intermediate data x"4 to x"7, which are represented by Numerical Expression 1, as the accumulated values.

Likewise, the memory 318 is configured to store the four pieces of data, and the signal generation section 312 generates the periodic signal of which the phase is not changed for each input data. In this case, when the number of the input data is 16, it is possible to obtain the intermediate data x"0 to x"3, which are represented by Numerical Expression 2, as the accumulated values. Further, the memory 318 is configured to store the four pieces of data, and the signal generation section 312 generates the periodic signal of which the phase is changed by $W^1$ for each input data. In this case, when the number of the input data is 16, it is possible to obtain the intermediate data x"8 to x"11, which are represented by Numerical Expression 3, as the accumulated values. Further-more, the memory 318 is configured to store the four pieces of data, and the signal generation section 312 generates the periodic signal of which the phase is changed by $W^3$ for each input data. In this case, when the number of the input data is 16, it is possible to obtain the intermediate data x"12 to x"15, which are represented by Numerical Expression 4, as the accumulated values.

That is, whenever the number of input data reaches 16, the arithmetic control section 336 changes the period of the periodic signal generated by the signal generation section 312, and resets the memory 318. In such a manner, it is possible to obtain the intermediate data x"0 to x"3, x"4 to x"7, x"8 to x"11, and x"12 to x"15 sequentially.

The memory 320 sequentially stores the intermediate data x"0 to x"3, x"4 to x"7, x"8 to x"11, or x"12 to x"15 which are obtained by the preprocessing execution section 310. The FFT (Fast Fourier Transform) 330 performs the Fast Fourier Transform on any one of the intermediate data x"0 to x"3, x"4 to x"7, x"8 to x"11, and x"12 to x"15 stored in the memory 320. The result of the Fast Fourier Transform performed by the FFT 330 is stored in the memory 332. The result of the Fast Fourier Transform stored in the memory 332 is sequentially provided to the multiplier 352 on the basis of the control performed by the readout address control section 334.

On the other hand, the PRN code generation section 340 generates the PRN code used in spreading the reception signal, and the FFT 344 performs the Fast Fourier Transform on the PRN code which is generated by the PRN code generation section 340. The result of the Fast Fourier Transform performed by the FFT 344 is stored in the memory 348.

The multiplier 352 multiplies complex conjugates of the result of the Fast Fourier Transform provided from the memory 332 and the result of the Fast Fourier Transform provided from the memory 348. That is, the multiplier 352 calculates a degree of correlation between the PRN code of the reception signal and the PRN code generated by the PRN code generation section 340 in the frequency domain.

The inverse-FFT 356 performs the Inverse Fast Fourier Transform on the multiplied result provided from the multiplier 352. The result of the Inverse Fast Fourier Transform performed by the inverse-FFT 356 shows the correlation between the PRN code of the reception signal and the PRN code generated by the PRN code generation section 340 in the time domain. The correlation point detection section 360 detects a correlation point, at which the PRN code of the reception signal is synchronized with the PRN code generated by the PRN code generation section 340, on the basis of the result of the Inverse Fast Fourier Transform.

3-2. Operation of Synchronization Capturing Section

Subsequently, a flow of the operation of the synchronization capturing section 240 according to the embodiment will be described with reference to FIG. 13. In the following description, for convenience of description, the intermediate data x"0 to x"3 is referred to as intermediate data A, the intermediate data x"4 to x"7 is referred to as intermediate data B, the intermediate data x"8 to x"11 is referred to as intermediate data C, and the intermediate data x"12 to x"15 is referred to as intermediate data D.

Figure 13:
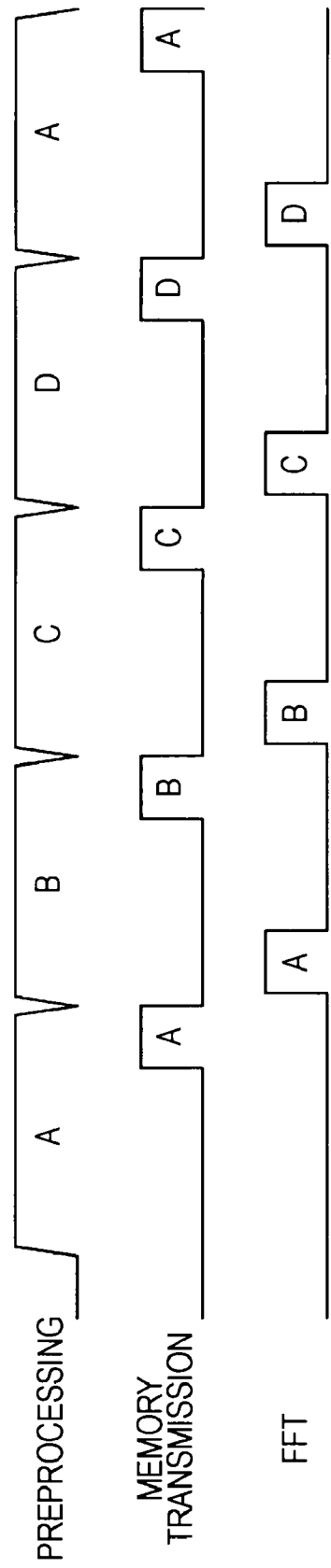
FIG. 13 is an explanatory diagram illustrating a flow of the operation of the synchronization capturing section according to the first embodiment.

FIG. 13 is an explanatory diagram illustrating the flow of the operation of the synchronization capturing section 240 according to the first embodiment. As shown in FIG. 13, the preprocessing execution section 310 sequentially performs the preprocessing for obtaining the intermediate data A, B, C, and D on the basis of the control performed by the arithmetic control section 336.

Further, in conjunction with termination of each preprocessing performed by the preprocessing execution section 310 for obtaining each of intermediate data A to D, the intermediate data obtained by the preprocessing is transmitted to the memory 320. Then, when the transmission of the intermediate data to the memory is terminated, the FFT 330 performs the Fast Fourier Transform on the intermediate data transmitted to the memory 320. Here, while the FFT 330 performs the Fast Fourier Transform on the intermediate data, the preprocessing execution section 310 is able to perform the preprocessing for obtaining new intermediate data. As a result, it is possible to shorten the time of the processing for obtaining the output data XO to X15 of the entire frequency.

4. Second Embodiment

As described above, the synchronization capturing section 240 according to the first embodiment includes one preprocessing execution section 310 and one memory 320. In contrast, a synchronization capturing section 240 according to a second embodiment includes two preprocessing execution sections 310 and two memories 320. With such a configuration, it is possible to shorten the processing time further.

4-1. Configuration of Synchronization Capturing Section

Figure 14:
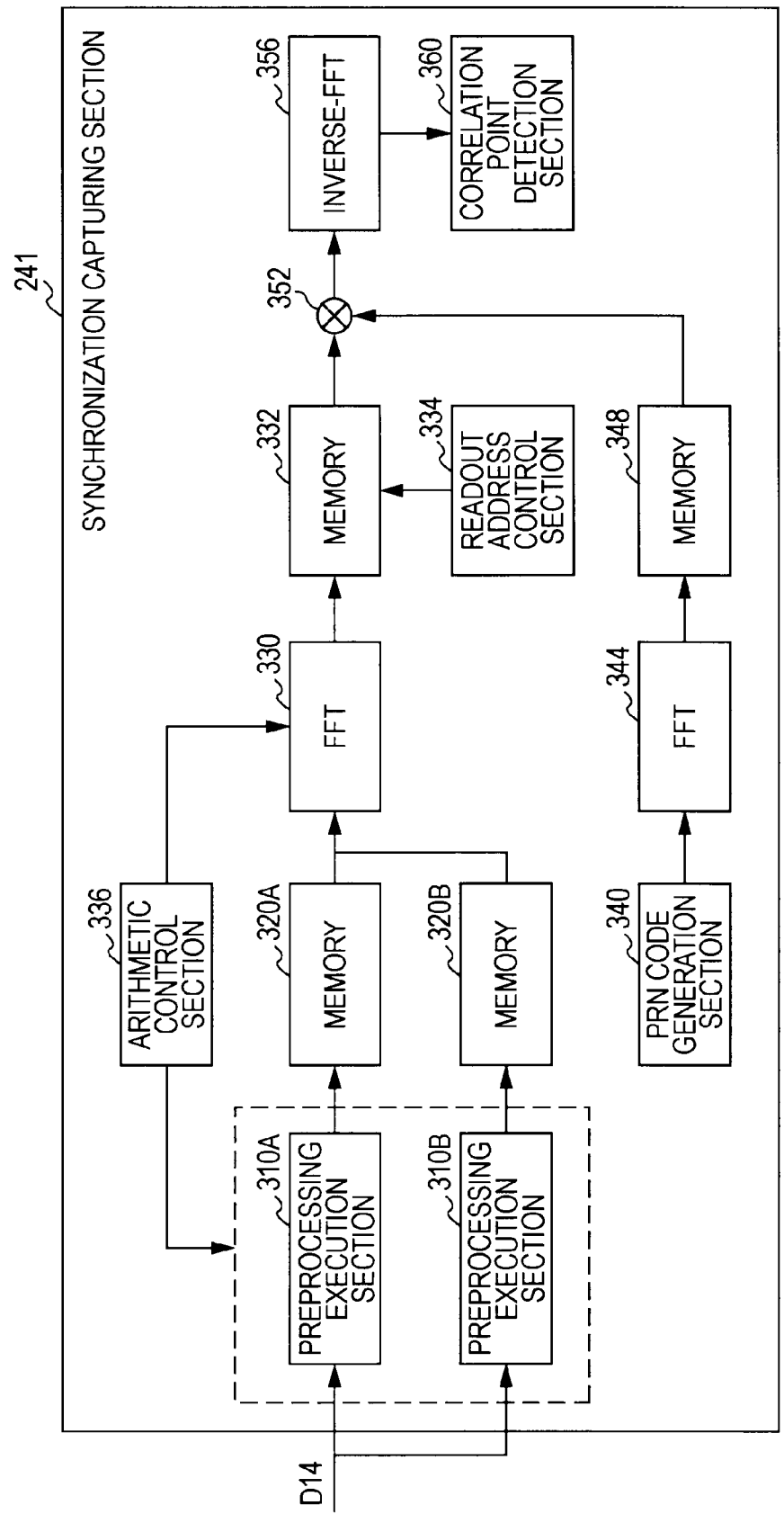
FIG. 14 is an explanatory diagram illustrating a configuration of a synchronization capturing section according to a second embodiment.

FIG. 14 is an explanatory diagram illustrating a configuration of the synchronization capturing section 241 according to the second embodiment. As shown in FIG. 14, the synchronization capturing section 241 according to the second embodiment includes: preprocessing execution sections 310A and 310B; memories 320A and 320B; an FFT 330; a memory 332; a readout address control section 334; an arithmetic control section 336; a PRN code generation section 340; an FFT 344; a memory 348; a multiplier 352; an inverse-FFT 356; and a correlation point detection section 360. In addition, the PRN code generation section 340, FFT 344, the memory 348, the multiplier 352, the inverse-FFT 356, the correlation point detection section 360, and the like can be configured to be practically the same as those of the synchronization capturing section 240 according to the first embodiment. Accordingly, the description thereof will be omitted.

The preprocessing execution sections 310A and 310B according to the embodiment generate periodic signals having different periods on the basis of the control performed by the arithmetic control section 336. Hence, it is possible to acquire different intermediate data from the respective preprocessing execution sections 310A and 310B.

The memory 320A stores the intermediate data obtained by the preprocessing execution section 310A, and the memory 320B stores the intermediate data obtained by the preprocessing execution section 310B.

4-2. Operation of Synchronization Capturing Section

Figure 15:
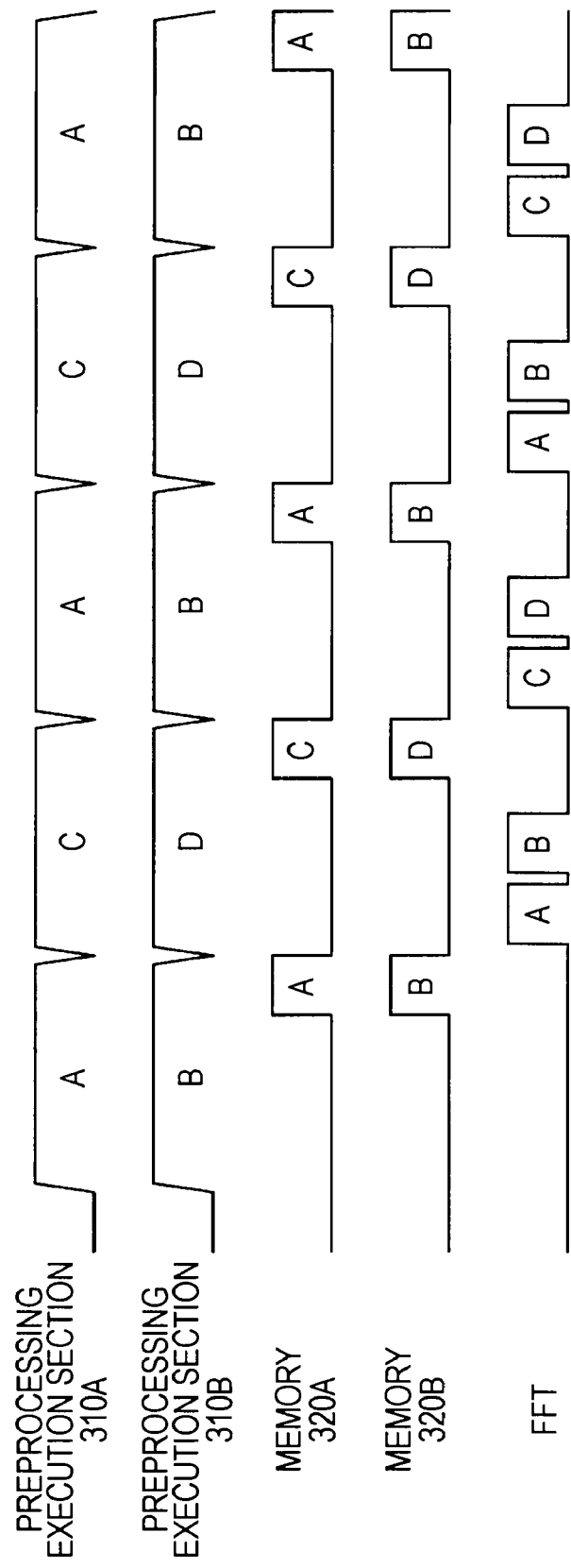
FIG. 15 is an explanatory diagram illustrating a flow of the operation of the synchronization capturing section according to the second embodiment.

FIG. 15 is an explanatory diagram illustrating the flow of the operation of the synchronization capturing section 241 according to the second embodiment. As shown in FIG. 15, the preprocessing execution section 310A alternately performs the preprocessing for obtaining the intermediate data A and the preprocessing for obtaining the intermediate data C on the basis of the control performed by the arithmetic control section 336. Further, the preprocessing execution section 310B alternately performs the preprocessing for obtaining the intermediate data B and the preprocessing for obtaining the intermediate data D on the basis of the control performed by the arithmetic control section 336.

Then, in conjunction with termination of each preprocessing performed by the preprocessing execution section 310A, the intermediate data obtained by the preprocessing execution section 310A is transmitted to the memory 320A. Moreover, when the transmission of the intermediate data to the memory is terminated, the FFT 330 performs the Fast Fourier Transform on the intermediate data transmitted to the memory 320A.

Likewise, in conjunction with termination of each preprocessing performed by the preprocessing execution section 310B, the intermediate data obtained by the preprocessing execution section 310B is transmitted to the memory 320B. Moreover, when the transmission of the intermediate data to the memory and the Fast Fourier Transform performed on the intermediate data of the memory 320A are terminated, the FFT 330 performs the Fast Fourier Transform on the intermediate data transmitted to the memory 320B.

As described above, the synchronization capturing section 241 according to the second embodiment includes a plurality of the preprocessing execution sections 310 and a plurality of the memories 320. Hence, it is possible to obtain different intermediate data in parallel. As a result, according to the second embodiment, it is possible to shorten the processing time further as compared with the first embodiment.

In addition, FIG. 15 shows an example in which the start timing (the rising edge in the drawing) of the input data acquisition performed by the preprocessing execution section 310A coincides with the start timing of the input data acquisition performed by the preprocessing execution section 310B, but both of the timings may be different.

5. Third Embodiment

As described above, the synchronization capturing section 240 according to the first embodiment and the synchronization capturing section 241 according to the second embodiment includes the preprocessing execution section 310 and the memory 320 the number of which is the same. In contrast, in a synchronization capturing section 242 according to a third embodiment, the number of the memories 320 is made to be smaller than that in the preprocessing execution section 310. As a result, it is possible to reduce the circuit size.

5-1. Configuration of Synchronization Capturing Section

Figure 16:
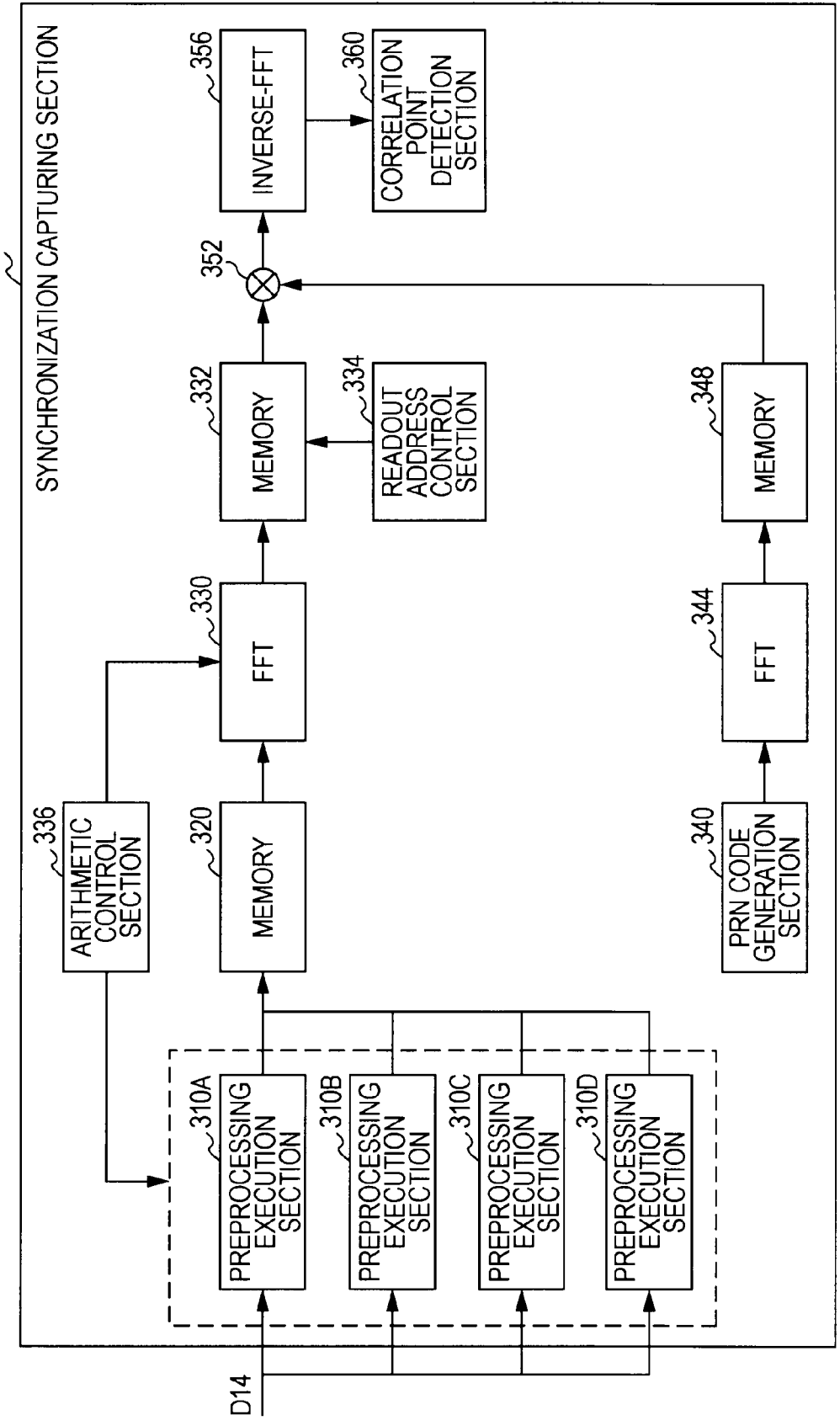
FIG. 16 is an explanatory diagram illustrating a configuration of a synchronization capturing section according to a third embodiment.

FIG. 16 is an explanatory diagram illustrating a configuration of the synchronization capturing section 242 according to the third embodiment. As shown in FIG. 16, the synchronization capturing section 242 according to the third embodiment includes: preprocessing execution sections 310A to 310D; a memory 320; an FFT 330; a memory 332; a readout address control section 334; an arithmetic control section 336; a PRN code generation section 340; an FFT 344; a memory 348; a multiplier 352; an inverse-FFT 356; and a correlation point detection section 360. In addition, the PRN code generation section 340, FFT 344, the memory 348, the multiplier 352, the inverse-FFT 356, the correlation point detection section 360, and the like can be configured to be practically the same as those of the synchronization capturing section 240 according to the first embodiment. Accordingly, the description thereof will be omitted.

The respective preprocessing execution sections 310A to 310D perform the preprocessing for obtaining different intermediate data. The respective intermediate data obtained by the preprocessing execution sections 310A to 310D are sequentially transmitted to the memory 320. The FFT 330 performs the Fast Fourier Transform on the intermediate data transmitted to the memory 320.

5-2. Operation of Synchronization Capturing Section

Figure 17:
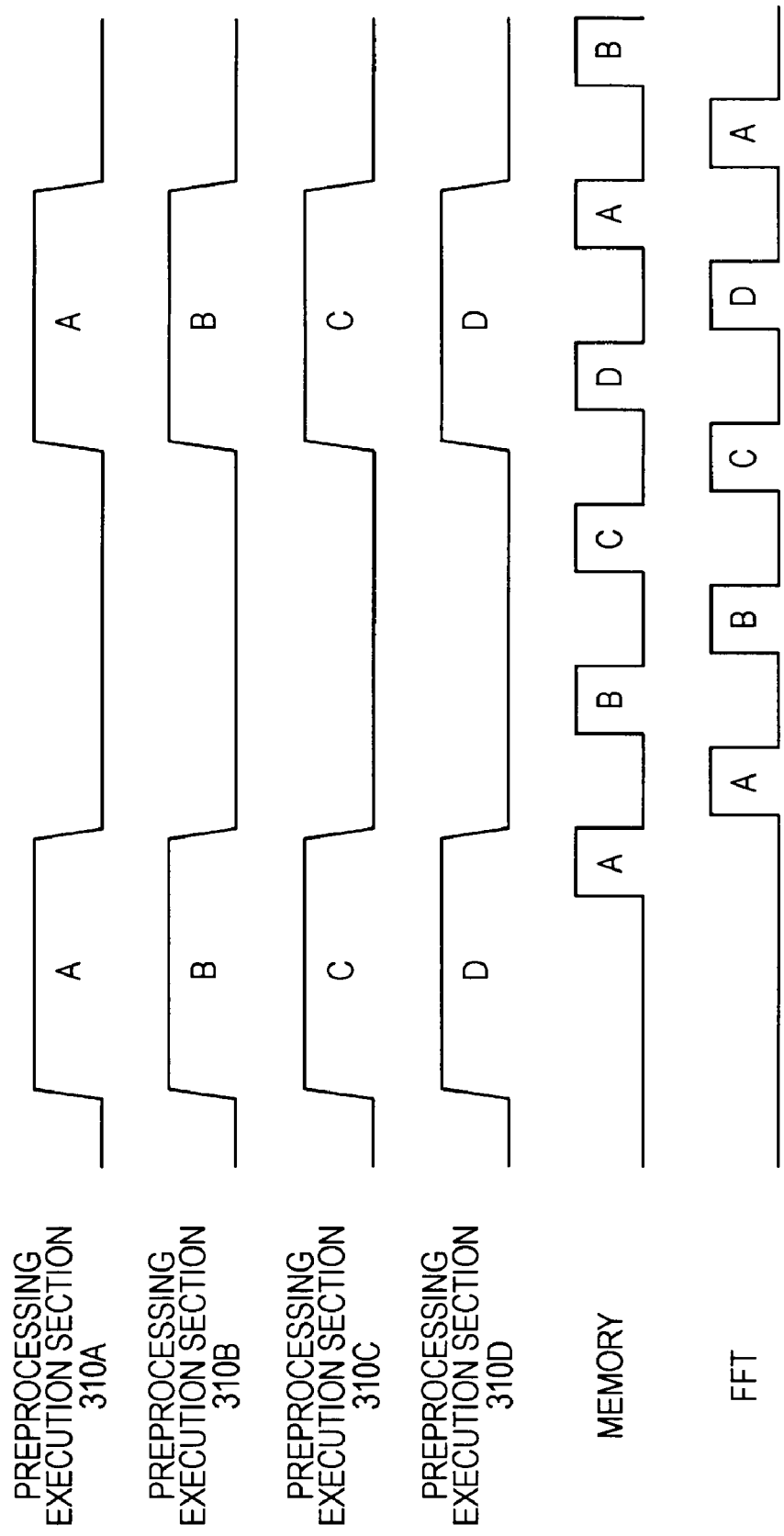
FIG. 17 is an explanatory diagram illustrating a flow of the operation of the synchronization capturing section according to the third embodiment.

FIG. 17 is an explanatory diagram illustrating the flow of the operation of the synchronization capturing section 242 according to the third embodiment. As shown in FIG. 17, the preprocessing execution section 310A performs the preprocessing for obtaining the intermediate data A, and the preprocessing execution section 310B performs the preprocessing for obtaining the intermediate data B. Likewise, the preprocessing execution section 310C performs the preprocessing for obtaining the intermediate data C, and the preprocessing execution section 310D performs the preprocessing for obtaining the intermediate data D.

Then, in conjunction with termination of each preprocessing performed by the preprocessing execution section 310A, the intermediate data A obtained by the preprocessing execution section 310A is transmitted to the memory 320. Moreover, when the transmission of the intermediate data A to the memory is terminated, the FFT 330 performs the Fast Fourier Transform on the intermediate data A which is transmitted to the memory 320.

Thereafter, the intermediate data B obtained by the preprocessing execution section 310B is transmitted to the memory 320, and the FFT 330 performs the Fast Fourier Transform on the intermediate data B transmitted to the memory 320. Subsequently, the intermediate data C obtained by the preprocessing execution section 310C is transmitted to the memory 320, and the FFT 330 performs the Fast Fourier Transform on the intermediate data C transmitted to the memory 320. Moreover, the intermediate data D obtained by the preprocessing execution section 310D is transmitted to the memory 320, and the FFT 330 performs the Fast Fourier Transform on the intermediate data D transmitted to the memory 320.

As described above, according to the embodiment, the intermediate data A to D obtained by the different preprocessing execution sections 310A to 310D are sequentially transmitted to the same memory 320. Accordingly, in the embodiment, it is not necessary to make the number of preprocessing execution sections 310 be the same as the number of memory 320. As a result, it is possible to reduce the circuit size.

6. Fourth Embodiment

Further, in the synchronization capturing section 243 according to a fourth embodiment described below, the preprocessing execution section 310 and the memory 320 are provided to have the same number as the division number. With such a configuration, it is possible to shorten further the processing time for obtaining the output data X0 to X15 of the entire frequency.

6-1. Configuration of Synchronization Capturing Section

Figure 18:
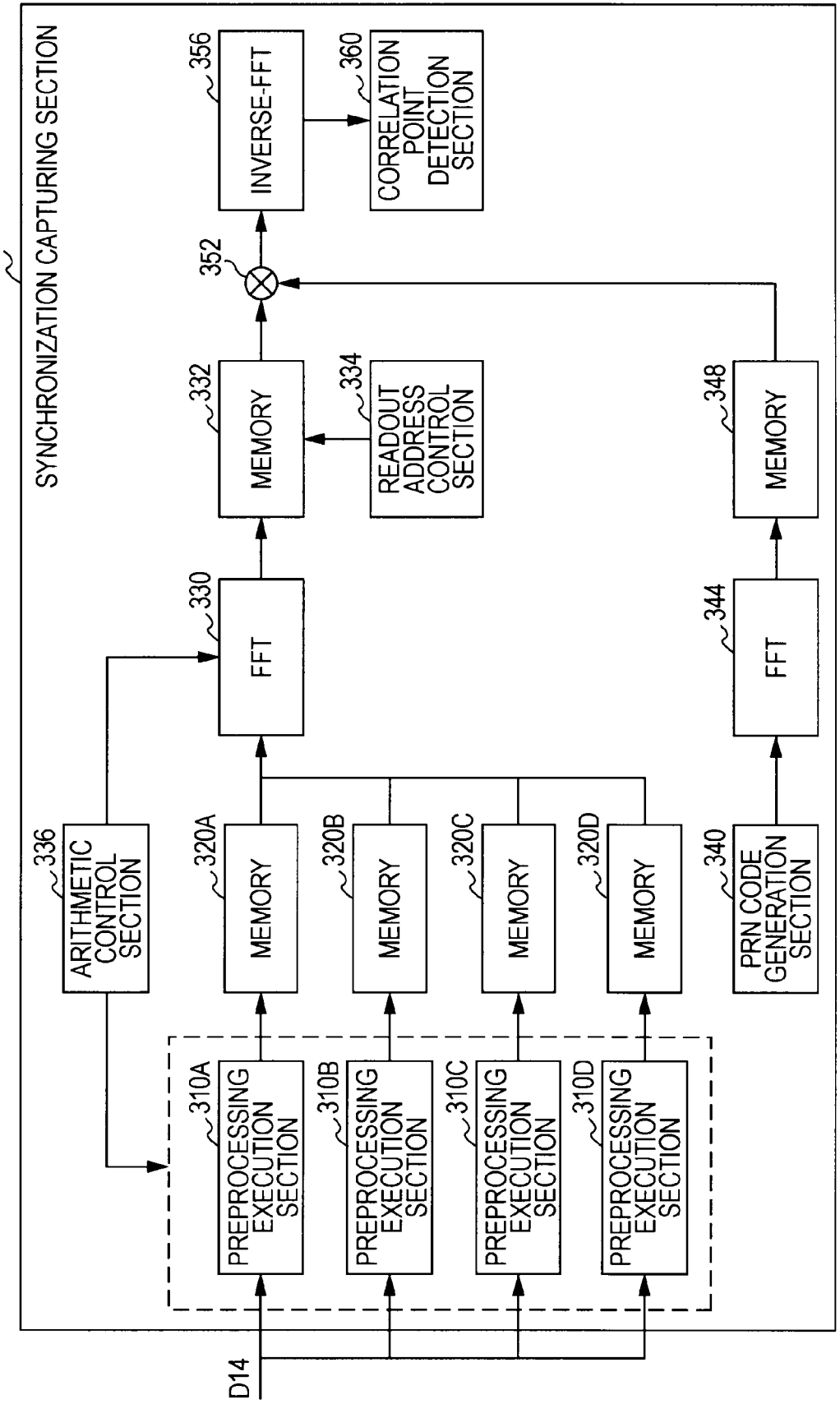
FIG. 18 is an explanatory diagram illustrating a configuration of a synchronization capturing section according to a fourth embodiment.

FIG. 18 is an explanatory diagram illustrating a configuration of the synchronization capturing section 243 according to the fourth embodiment. As shown in FIG. 18, the synchronization capturing section 243 according to the fourth embodiment includes: preprocessing execution sections 310A to 310D; memories 320A to 320D; an FFT 330; a memory 332; a readout address control section 334; an arithmetic control section 336; a PRN code generation section 340; an FFT 344; a memory 348; a multiplier 352; an inverse-FFT 356; and a correlation point detection section 360. In addition, the PRN code generation section 340, FFT 344, the memory 348, the multiplier 352, the inverse-FFT 356, the correlation point detection section 360, and the like can be configured to be practically the same as those of the synchronization capturing section 240 according to the first embodiment. Accordingly, the description thereof will be omitted.

The respective preprocessing execution sections 310A to 310D perform preprocessing for obtaining different intermediate data. The intermediate data obtained by the preprocessing execution section 310A is transmitted to the memory 320A, and the intermediate data obtained by the preprocessing execution section 310B is transmitted to the memory 320B. Likewise, the intermediate data obtained by the preprocessing execution section 310C is transmitted to the memory 320C, and the intermediate data obtained by the preprocessing execution section 310D is transmitted to the memory 320D.

The FFT 330 sequentially performs the Fast Fourier Transform on the intermediate data transmitted to the memories 320A to 320D.

6-2. Operation of Synchronization Capturing Section

Figure 19:
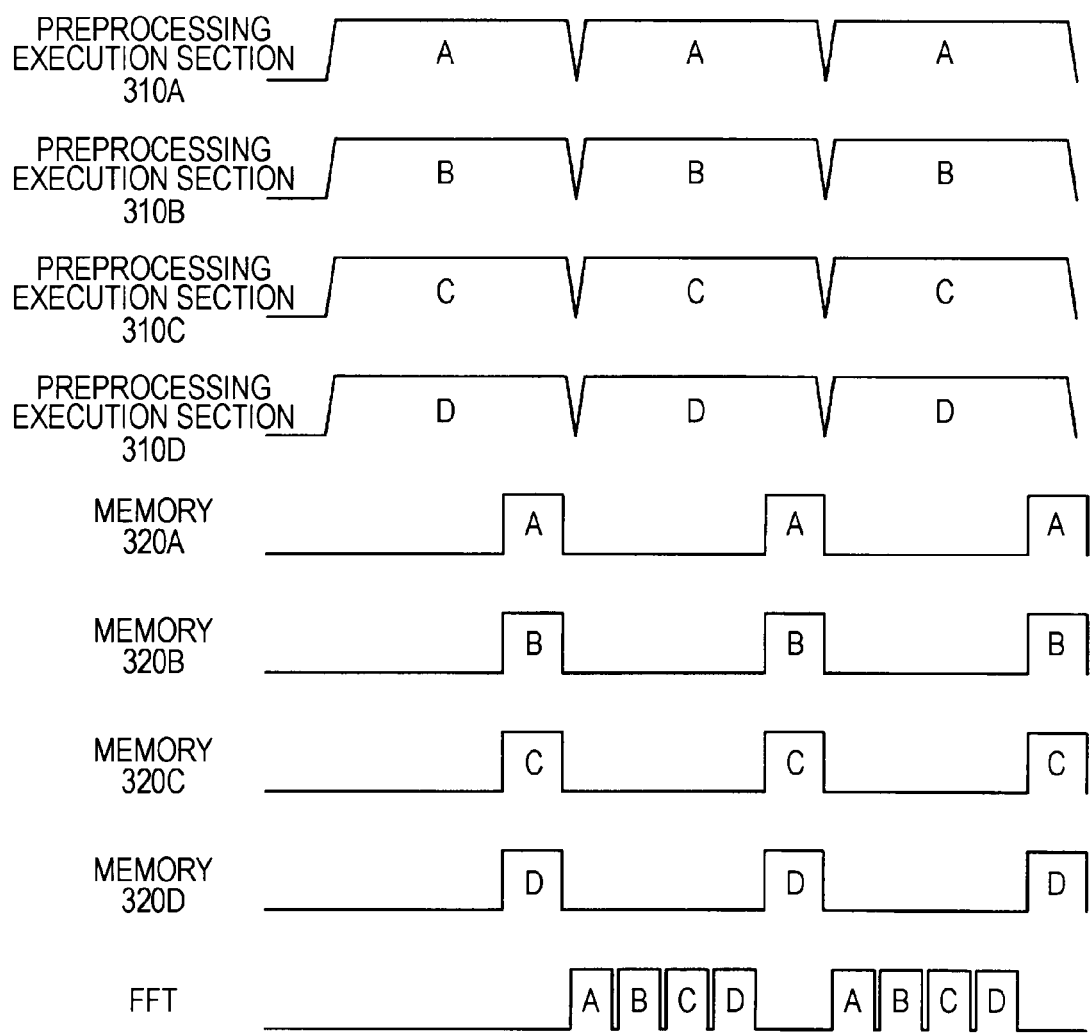
FIG. 19 is an explanatory diagram illustrating a flow of the operation of the synchronization capturing section according to the fourth embodiment.

FIG. 19 is an explanatory diagram illustrating the flow of the operation of the synchronization capturing section 243 according to the fourth embodiment. As shown in FIG. 19, the preprocessing execution section 310A performs the preprocessing for obtaining the intermediate data A, and the preprocessing execution section 310B performs the preprocessing for obtaining the intermediate data B. Likewise, the preprocessing execution section 310C performs the preprocessing for obtaining the intermediate data C, and the preprocessing execution section 310D performs the preprocessing for obtaining the intermediate data D.

Then, in conjunction with termination of each preprocessing performed by the preprocessing execution section 310A, the intermediate data A obtained by the preprocessing execution section 310A is transmitted to the memory 320A. Further, in conjunction with termination of each preprocessing performed by the preprocessing execution section 310B, the intermediate data B obtained by the preprocessing execution section 310B is transmitted to the memory 320B. Furthermore, in conjunction with the termination of each preprocessing performed by the preprocessing execution section 310C, the intermediate data C obtained by the preprocessing execution section 310C is transmitted to the memory 320C. Likewise, in conjunction with termination of each preprocessing performed by the preprocessing execution section 310D, the intermediate data D obtained by the preprocessing execution section 310D is transmitted to the memory 320D.

Thereafter, the FFT 330 sequentially performs the Fast Fourier Transform on the intermediate data transmitted to the memories 320A to 320D.

As described above, according to the embodiment, it is possible to perform parallel the preprocessing for obtaining the respective intermediate data and the transmission of the respective intermediate data to the memories. As a result, it is possible to shorten the time of the processing for obtaining the output data X0 to X15 of the entire frequency.

7. Fifth Embodiment

In the above description, the example in which 16 pieces of input data are used for the Fast Fourier Transform was given for convenience of description. However, actually, the input data corresponding to several milliseconds is used for the Fast Fourier Transform. Here, as described with reference to FIG. 2, the length of bits constituting the navigation message is 20 msec. Accordingly, the value of a bit in the used input data is likely to be changed, and it may be difficult to detect normally the correlation point of the PRN code. The synchronization capturing section 244 according to the fifth embodiment is able to prevent such a case.

7-1. Configuration of Synchronization Capturing Section

Figure 20:
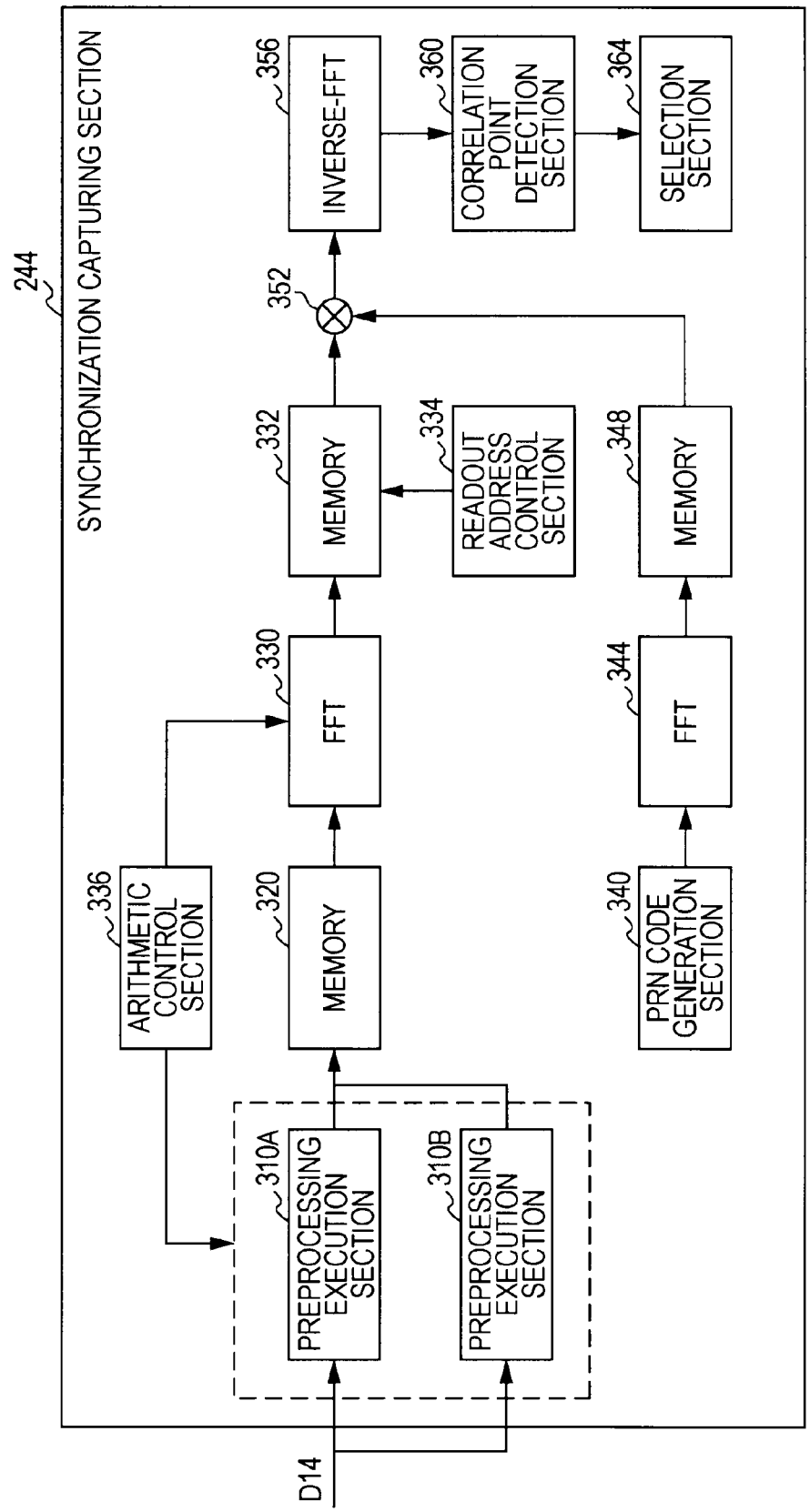
FIG. 20 is an explanatory diagram illustrating a configuration of a synchronization capturing section according to a fifth embodiment.

FIG. 20 is an explanatory diagram illustrating a configuration of the synchronization capturing section 244 according to the fifth embodiment. As shown in FIG. 20, the synchronization capturing section 244 according to the fifth embodiment includes: preprocessing execution sections 310A and 310B; a memory 320; an FFT 330; a memory 332; a readout address control section 334; an arithmetic control section 336; a PRN code generation section 340; an FFT 344; a memory 348; a multiplier 352; an inverse-FFT 356; a correlation point detection section 360; and a selection section 364. In addition, the PRN code generation section 340, FFT 344, the memory 348, the multiplier 352, the inverse-FFT 356, the correlation point detection section 360, and the like can be configured to be practically the same as those of the synchronization capturing section 240 according to the first embodiment. Accordingly, the description thereof will be omitted.

The preprocessing execution sections 310A and 310B start acquiring the input data at different timings, and perform the preprocessing for obtaining the intermediate data on the basis of the periodic signals having the same period. The respective intermediate data obtained by the preprocessing execution sections 310A and 310B are transmitted to the memory 320. The FFT 330 sequentially performs the Fast Fourier Transform on the intermediate data transmitted to the memory 320. The result of the Fast Fourier Transform performed by the FFT 330 is provided to the memory 332.

The multiplier 352 multiplies complex conjugates of the result of the Fast Fourier Transform provided from the memory 332 and the result of the Fast Fourier Transform provided from the memory 348. The inverse-FFT 356 performs the Inverse Fast Fourier Transform on the multiplied result provided from the multiplier 352. The result of the Inverse Fast Fourier Transform performed by the inverse-FFT 356 shows the correlation between the PRN code of the reception signal and the PRN code generated by the PRN code generation section 340 in the time domain. The correlation point detection section 360 detects a correlation point, at which the PRN code of the reception signal is synchronized with the PRN code generated by the PRN code generation section 340, on the basis of the result of the Inverse Fast Fourier Transform.

The selection section 364 compares the output based on the intermediate data, which is obtained by the preprocessing execution section 310A, and the output based on the intermediate data which is obtained by the preprocessing execution section 310B, from the correlation point detection section 360, and selects the favorable one of the outputs as a correlation point.

7-2. Operation of Synchronization Capturing Section

Figure 21:
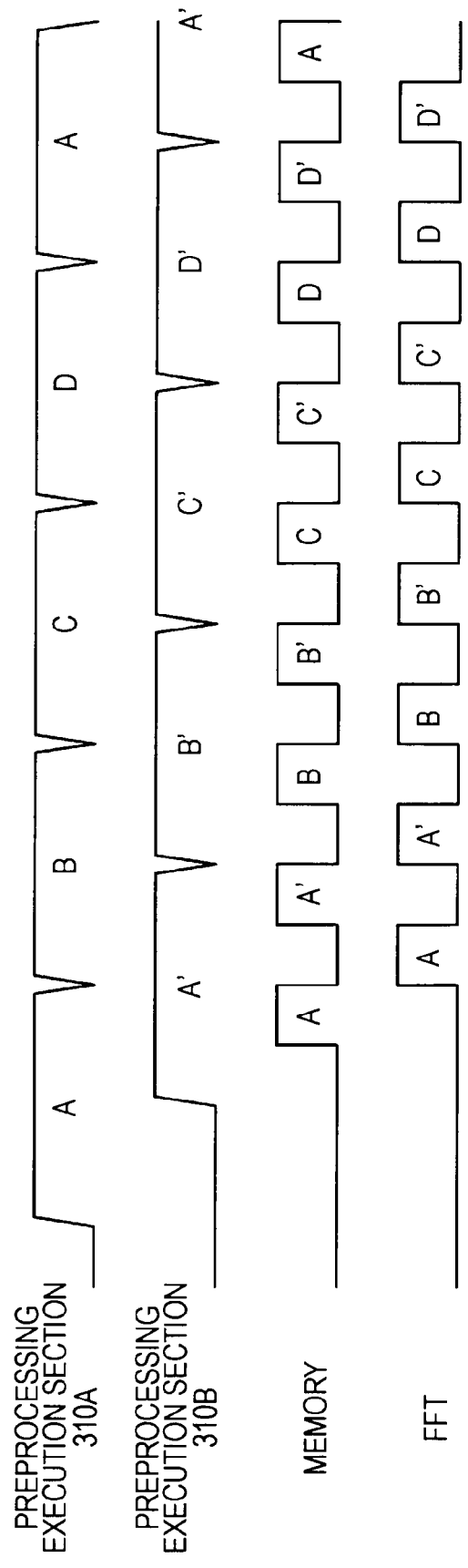
FIG. 21 is an explanatory diagram illustrating a flow of the operation of the synchronization capturing section according to the fifth embodiment.

FIG. 21 is an explanatory diagram illustrating the flow of the operation of the synchronization capturing section 244 according to the fifth embodiment. As shown in FIG. 21, the preprocessing execution section 310A sequentially performs the preprocessing for obtaining the intermediate data A, B, C, and D on the basis of the control performed by the arithmetic control section 336. Further, the preprocessing execution section 310B sequentially performs the preprocessing for obtaining the intermediate data A', B', C', and D' at a timing different from that of the preprocessing execution section 310A on the basis of the control performed by the arithmetic control section 336. In addition, the intermediate data A' is data that can be obtained on the basis of a periodic signal in which the start timing of the input data acquisition is different from that of the intermediate data A and the period thereof is the same as that of the intermediate data A. The intermediate data B', C', and D' can be obtained in such a manner.

Then, in conjunction with termination of each preprocessing performed by the preprocessing execution section 310A, the intermediate data obtained by the preprocessing execution section 310A is transmitted to the memory 320. Further, in conjunction with termination of each preprocessing performed by the preprocessing execution section 310B, the intermediate data obtained by the preprocessing execution section 310B is transmitted to the memory 320.

The FFT 330 sequentially performs the Fast Fourier Transform on the intermediate data transmitted to the memory 320. Thereafter, the correlation point detection section 360 detects the correlation point based on the result of the Fast Fourier Transform performed on the intermediate data by the FFT 330 and the result of the Fast Fourier Transform provided from the memory 348. Then, the selection section 364 selects any one of the output based on the result of the Fast Fourier Transform of the intermediate data A to D and the output based on the result of the Fast Fourier Transform of the intermediate data A' to D' from the correlation point detection section 360. As a result, according to the embodiment, it is possible to prevent the correlation point of the PRN code from being detected abnormally by replacement of bit values in the input data.

8. Advantages of Embodiments of the Invention (1) According to the embodiment, as shown in FIGS. 13 and 15, it is possible to perform simultaneously the preprocessing performed by the preprocessing execution section 310 for obtaining the intermediate data and the Fast Fourier Transform performed by the FFT 330. As a result, it is possible to shorten the processing time.

(2) Further, according to the embodiment, it is possible to reduce the volume necessary for the memory 320 which is disposed ahead of the FFT 330. The reason is as follows.

In the synchronization capturing section 240' shown in FIG. 5 according to the embodiment of the invention, the data, which is converted into digital format by the ADC 236, is directly recorded in the memory 32. For this reason, when the sampling frequency is N (kHz), the number of bits is I (Bit), and the length of the input data is M (ms), the size of N×M×I (Bit) is necessary for the memory 32.

However, the most energy of the input data is thermal noise, and it can be regarded as random digits depending on a Gaussian distribution. For this reason, the accumulation of the input data is performed as described in the embodiment of the invention. Thereby, it is possible to reduce the volume necessary for the memory 320.

For example, a case is considered in which the Fast Fourier Transform is divided into 16 and is performed. Further, the standard deviation of the input data is represented by $\sigma 0$ and the standard deviation of the intermediate data obtained by 16 additions in the preprocessing execution section 310 is represented by $\sigma 1$. In addition, the maximum value Max0, which is expressed as I (Bit) by allowing the ADC 236 to perform an appropriate threshold processing, is represented by $3 \times \sigma 0$. In this case, the following expression is established.

$$\sigma 1 = \sqrt{16 \times \sigma 0} = 4 = \sigma 0 \text{ (additivity of variance)}$$

Further, when the maximum value Max1 of the intermediate data is represented by $3 \times \sigma 1$, the following expression is established.

$$Max1 = 3 \times \sigma 1 = 12 \times \sigma 0 = 4 \times Max0$$

As can be seen from the above expressions, the Max1 is four times Max0, and thus it is enough for the number of bits for storing the respective intermediate data to be further increased by 2 bits than the number of bits for storing the input data. Accordingly, a volume of N×M×I (Bit) is necessary for the memory 32 the synchronization capturing section 240' according to the embodiment of the invention, while a volume of N×M÷16×(I+2) (Bit) is necessary for the memory 320 according to the embodiment of the invention. Here, since I is an integer, it is possible to reduce the volume of the memory 320 significantly. In addition, in the case where the Fast Fourier Transform is divided into four, the volume necessary for the memory 320 is N×M÷4×(I+1) (Bit). Hence, it is possible to reduce the volume of the memory 320.

(3) Normally, it is necessary for the number of data to be input to the FFT to be a number of the power of two in view of the characteristics of the FFT. Accordingly, when the reception signal of 1023 chip/ms is sampled in multiples of 1.024 MHz, in the past, only a sampling value corresponding to 8 ms, a sampling value corresponding to 16 ms, and the like can be used as the input data to the FFT.

In contrast, in the embodiment of the invention, it is necessary for the number of the intermediate data input to the FFT 330 to be a number of the power of two, but the number of additions in the preprocessing execution section 310 is not particularly limited if it is an integer equal to or greater than 2. As a result, by appropriately setting the number of additions in the preprocessing execution section 310, that is, the number of divisions of the Fast Fourier Transform, a sampling value corresponding to a certain integer ms can be used as the input data for the Fast Fourier Transform.

For example, the number of additions in the preprocessing execution section 310, that is, the number of divisions of the Fast Fourier Transform may be set to 5. In this case, a sampling value corresponding to 5 ms can be used as the input data for the Fast Fourier Transform.

(4) As shown in FIG. 18, the synchronization capturing section 243 according to the fourth embodiment includes a plurality of the preprocessing execution sections 310 and the memories 320 for the input to the FFT 330. Hence, when the Fast Fourier Transform is performed more rapidly than the preprocessing, as shown in FIG. 19, the preprocessing execution sections 310 completely transmit the intermediate data to the memories 320, and are then able to start the acquisition of the subsequent input data and the preprocessing thereof.

(5) Further, according to the fifth embodiment, the plurality of preprocessing execution sections 310 starts the acquisition of the input data at different timings, and performs the preprocessing for obtaining the intermediate data on the basis of the periodic signals having the same period. Moreover, the selection section 364 compares the output based on the intermediate data, which are obtained by the respective preprocessing execution sections 310, from the correlation point detection section 360, and selects favorable one of the outputs. As a result, according to the fifth embodiment, it is possible to prevent the correlation point of the PRN code from being detected abnormally by the replacement of the bit values in the input data.

The present application contains subject matter related to that disclosed in Japanese Priority Patent Application JP 2009-096195 filed in the Japan Patent Office on Apr. 10, 2009, the entire content of which is hereby incorporated by reference.

The preferred embodiments of the invention were hitherto described with reference to the appended drawings, but the invention is not limited to the above-mentioned examples. It will be readily apparent to those skilled in the art that obvious modifications, derivations, and variations can be made without departing from the technical scope described in the claims appended hereto. In addition, it should be understood that such modifications, derivations, and variations belong to the technical scope of the invention.

What is claimed is:

1. A communication system comprising:
a sampling section that samples a reception signal;
a plurality of preprocessing execution sections that acquire a sampling value, obtained by the sampling section, while executing preprocessing for performing a Fast Fourier Transform in a divided manner, each of the plurality of preprocessing sections including:
    a signal generation section that generates a periodic signal;
    a multiplier section that multiplies the sampling value, which is obtained by the sampling section, and a value of the periodic signal which is generated by the signal generation section, and
    an accumulator section that accumulates the respective multiplied values, which are obtained by the multiplier section, at a predetermined interval in an order, which is obtained by the multiplier section, so as to obtain a plurality of accumulated values;
wherein the signal generation sections, each of which is included in each of the preprocessing execution sections, generate periodic signals having different periods; and
a Fast Fourier Transform section that performs the Fast Fourier Transform in the divided manner on the basis of an output acquired from the plurality of preprocessing execution sections, and wherein the Fast Fourier Transform section performs the Fast Fourier Transform on the plurality of accumulated values which are obtained by the accumulator section.

2. The communication system according to claim 1,
wherein the accumulator sections corresponding to the respective preprocessing execution sections accumulate the respective multiplied values in units of a predetermined length of a reception signal,
wherein the communication system further comprises memories corresponding to the respective preprocessing execution sections,
wherein the memories store the plurality of accumulated values is obtained by the corresponding preprocessing execution sections, and
wherein the Fast Fourier Transform section sequentially performs the Fast Fourier Transform on the plurality of accumulated values stored in the respective memories.

3. The communication system according to claim 2,
wherein a spectrum of the reception signal is spread by a spreading code,
wherein the communication system further comprises:
    a second preprocessing execution section of the plurality of preprocessing execution sections that includes a respective second signal generation section that generates a periodic signal having a same period as a respective first signal generation section of a first preprocessing execution section of the plurality of preprocessing execution sections, in which a reception signal thereof is different in position, which is expressed in units of the predetermined length, from that of the first preprocessing execution section;
    a correlation point detection section that detects a correlation point of the spreading code on the basis of a result of the Fast Fourier Transform performed by the Fast Fourier Transform section; and
    a selection section that selects any one of the correlation points, which is detected by the correlation point detection section on the basis of the result of the Fast Fourier Transform performed on the plurality of accumulated values obtained by the first preprocessing execution section, and the correlation point which is detected by the correlation point detection section on the basis of the result of the Fast Fourier Transform performed on the plurality of accumulated values obtained by the second preprocessing execution section.

4. A communication system comprising:
a sampling section that samples a reception signal;
a preprocessing execution section that acquires a sampling value obtained by the sampling section, the preprocessing execution section including
    a signal generation section that generates a periodic signal;

a multiplier section that multiplies the sampling value, which is obtained by the sampling section, and a value of the periodic signal which is generated by the signal generation section; and an accumulator section that accumulates the respective multiplied values, which are obtained by the multiplier section, at a predetermined interval in an order, which is obtained by the multiplier section, so as to obtain a plurality of accumulated values; and a Fast Fourier Transform section that performs the Fast Fourier Transform in a divided manner on the plurality of accumulated values obtained by the accumulator section, wherein the accumulator section accumulates the respective multiplied values in units of the predetermined length of the reception signal, and wherein the signal generation section changes the period of the generated periodic signal in units of the predetermined length of the reception signal.

5. A signal processing device comprising:

a sampling section that samples a reception signal;

a plurality of preprocessing execution sections that acquire a sampling value, obtained by the sampling section, while executing preprocessing for performing a Fast Fourier Transform in a divided manner, each of the plurality of preprocessing sections including:

a signal generation section that generates a periodic signal;

a multiplier section that multiplies the sampling value, which is obtained by the sampling section, and a value of the periodic signal which is generated by the signal generation section, and an accumulator section that accumulates the respective multiplied values, which are obtained by the multiplier section, at a predetermined interval in an order, which is obtained by the multiplier section, so as to obtain a plurality of accumulated values;

wherein the signal generation sections, each of which is included in each of the preprocessing execution sections, generate periodic signals having different periods; and a Fast Fourier Transform section that performs the Fast Fourier Transform in the divided manner on the basis of an output acquired from the plurality of preprocessing execution sections, and wherein the Fast Fourier Transform section performs the Fast Fourier Transform on the plurality of accumulated values which are obtained by the accumulator section.

6. A movable body equipped with a communication system comprising:

a sampling section that samples a reception signal;

a plurality of preprocessing execution sections that acquire a sampling value, obtained by the sampling section, while executing preprocessing for performing a Fast Fourier Transform in a divided manner, each of the plurality of preprocessing sections including:

a signal generation section that generates a periodic signal;

a multiplier section that multiplies the sampling value, which is obtained by the sampling section, and a value of the periodic signal which is generated by the signal generation section, and an accumulator section that accumulates the respective multiplied values, which are obtained by the multiplier section, at a predetermined interval in an order, which is obtained by the multiplier section, so as to obtain a plurality of accumulated values;

wherein the signal generation sections, each of which is included in each of the preprocessing execution sections, generate periodic signals having different periods; and a Fast Fourier Transform section that performs the Fast Fourier Transform in the divided manner on the basis of an output acquired from the plurality of preprocessing execution sections, and wherein the Fast Fourier Transform section performs the Fast Fourier Transform on the plurality of accumulated values which are obtained by the accumulator section.

* * * * *